US012647916B2

(12) United States Patent
Marcone et al.

(10) Patent No.: US 12,647,916 B2
(45) Date of Patent: Jun. 2, 2026

(54) DOPPLER SHIFT REPORTING IN A SINGLE FREQUENCY NETWORK

(71) Applicant: Nokia Technologies Oy, Espoo (FI)

(72) Inventors: Alessio Marcone, Munich (DE); Youngsoo Yuk, Seoul (KR); Nitin Mangalvedhe, Hoffman Estates, IL (US); Jorge Morte Palacios, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 155 days.

(21) Appl. No.: 18/257,980

(22) PCT Filed: Jan. 3, 2022

(86) PCT No.: PCT/EP2022/050006
§ 371 (c)(1),
(2) Date: Jun. 16, 2023

(87) PCT Pub. No.: WO2022/152582
PCT Pub. Date: Jul. 21, 2022

(65) Prior Publication Data
US 2024/0064674 A1      Feb. 22, 2024

Related U.S. Application Data

(60) Provisional application No. 63/137,790, filed on Jan. 15, 2021.

(51) Int. Cl.
*H04W 56/00*        (2009.01)
*H04L 27/26*        (2006.01)

(52) U.S. Cl.
CPC ..... *H04W 56/0035* (2013.01); *H04L 27/2657* (2013.01); *H04L 27/2675* (2013.01)

(58) Field of Classification Search
CPC .............. H04W 56/0035; H04W 24/10; H04L 27/2657; H04L 27/2675; H04L 27/0014;
(Continued)

(56) References Cited

U.S. PATENT DOCUMENTS 10,490,074 B2    11/2019  Jiang et al.
10,790,956 B2     9/2020  Cheng et al.
(Continued)

FOREIGN PATENT DOCUMENTS

EP          3457649 A1       3/2019
WO        2020/032855 A1      2/2020
WO      WO-2024020038 A1 *    1/2024   ............. H04B 7/063

OTHER PUBLICATIONS

Vivo, "Further discussion and evaluation on MTRP CSI and partial reciprocity", 3GPP TSG RAN WG1 #103-e, R1-2007650, e-Meeting, Oct. 26-Nov. 13, 2020 (Year: 2020).*
(Continued)

*Primary Examiner* — Shah M Rahman
(74) *Attorney, Agent, or Firm* — Carter, DeLuca & Farrell LLP

(57)        ABSTRACT

According to an example implementation, a method for frequency offset reporting includes transmitting, by a first transceiver, a first tracking reference signal to a user device in a wireless communication system, transmitting, by a second transceiver, a second tracking reference signal to the user device, receiving, by the base station, a channel state information (CSI) reporting signal via an uplink channel, where the CSI reporting signal includes power estimation information. The method includes determining whether to pre-compensate a frequency of a downlink signal with frequency offset information based on the power estimation information, and transmitting, by at least one of the first transceiver or the second transceiver, the downlink signal
(Continued)

800

Receiving, by a user device from a first transceiver of a base station, a first tracking reference signal — 802

Receiving, by the user device from a second transceiver of the base station, a second tracking reference signal — 804

Estimating power estimation information using the first and second tracking reference signals — 806

Transmitting, by the user device, a channel state information (CSI) reporting signal via an uplink channel, where the CSI reporting signal includes the power estimation information, and the power estimation information is configured to be used by the base station to determine whether to pre-compensate a frequency of a downlink signal with frequency offset information — 808 with the pre-compensated frequency in response to the determination to pre-compensate the frequency of the downlink signal.

7 Claims, 10 Drawing Sheets

(58) Field of Classification Search
    CPC ................ H04L 5/0023; H04L 5/0048; H04L 2027/002; H04L 2027/0065; H04B 7/0626
    See application file for complete search history.

(56) References Cited

U.S. PATENT DOCUMENTS

| | | | |
|---|---|---|---|
| 2020/0374079 A1 | 11/2020 | Chervyakov et al. | |
| 2021/0320685 A1* | 10/2021 | Venugopal | H04B 1/62 |
| 2022/0116256 A1* | 4/2022 | Shahmohammadian | H04L 5/0048 |
| 2022/0123891 A1* | 4/2022 | Ji | H04L 5/0051 |
| 2023/0064231 A1* | 3/2023 | Haghighat | H04L 5/0053 |
| 2023/0155760 A1* | 5/2023 | Sun | H04L 5/0035 370/329 |
| 2023/0291440 A1* | 9/2023 | Zhang | H04L 25/0222 |
| 2023/0318688 A1* | 10/2023 | Huang | H04L 5/0051 370/329 |
| 2023/0413197 A1* | 12/2023 | Zhu | H04L 5/0051 |
| 2024/0056149 A1* | 2/2024 | Hindy | H04L 5/0035 |
| 2024/0381354 A1* | 11/2024 | Wang | H04L 5/0094 |

OTHER PUBLICATIONS

"3rd Generation Partnership Project; Technical Specification Group Radio Access Network; NR; Physical layer procedures for data (Release 16)", 3GPP TS 38.214, V16.3.0, Sep. 2020, pp. 1-166.

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Radio Resource Control (RRC) protocol specification (Release 16)", 3GPP TS 38.331, V16.2.0, Sep. 2020, pp. 1-921.

Levanen et al., "Location-Aware 5G Communications and Doppler Compensation for High-Speed Train Networks", European Conference on Networks and Communications (EuCNC), Jun. 12-15, 2017, 6 pages.

International Search Report and Written Opinion received for corresponding Patent Cooperation Treaty Application No. PCT/EP2022/050006, dated Apr. 20, 2022, 18 pages.

"Further discussion and evaluation on HST-SFN schemes", 3GPP TSG RAN WG1 #103-e, R1-2007648, Agenda: 8.1.2.4, vivo, Oct. 26-Nov. 13, 2020, 11 pages.

"3rd Generation Partnership Project; Technical Specification Group Radio Access Network; Study on performance enhancements for high speed scenario in LTE (Release 13)", 3GPP TR 36.878, V13.0.0, Jan. 2016, pp. 1-92.

"Enhancements for HST-SFN deployment", 3GPP TSG RAN WG1 #104-e Meeting, R1-2101009, Agenda: 8.1.2.4, Nokia, Jan. 25-Feb. 5, 2021, 12 pages.

* cited by examiner

200

300

400

700

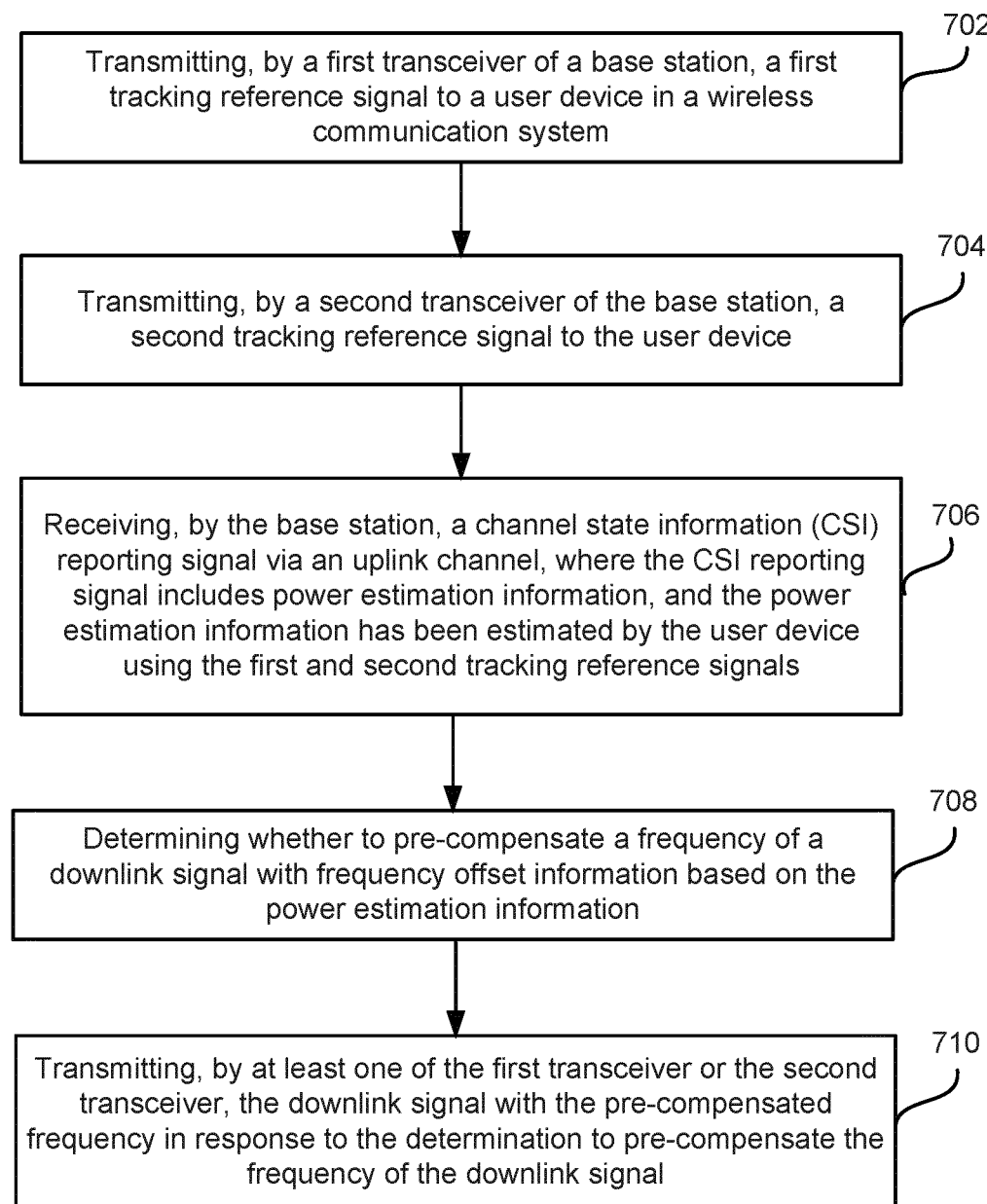

702

Transmitting, by a first transceiver of a base station, a first tracking reference signal to a user device in a wireless communication system

704

Transmitting, by a second transceiver of the base station, a second tracking reference signal to the user device

706

Receiving, by the base station, a channel state information (CSI) reporting signal via an uplink channel, where the CSI reporting signal includes power estimation information, and the power estimation information has been estimated by the user device using the first and second tracking reference signals

708

Determining whether to pre-compensate a frequency of a downlink signal with frequency offset information based on the power estimation information

710

Transmitting, by at least one of the first transceiver or the second transceiver, the downlink signal with the pre-compensated frequency in response to the determination to pre-compensate the frequency of the downlink signal

DOPPLER SHIFT REPORTING IN A SINGLE FREQUENCY NETWORK

RELATED APPLICATION

This application was originally filed as PCT Application No. PCT/EP2022/050006 on Jan. 3, 2022, which claims priority from U.S. Provisional Application No. 63/137,790, filed Jan. 15, 2021, each of which is incorporated herein by reference in its entirety.

TECHNICAL FIELD

This description relates to doppler shift reporting, and in particular, to doppler shift reporting in a high speed train-single frequency network (HST-SFN) deployment scenario.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UEs). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services.

High Speed Train-Single Frequency Network (HST-SFN) refers to the scenario where users inside a train are served by multiple radio resource heads (RRHs) (or multiple transmit-receive-points (TRPs)) that operate as a network at a single frequency. When the high speed train is near the midtrack point (e.g., a midpoint between two RRHs), the UE receivers may experience decreased performance of the Doppler shift estimator since the single composite Doppler shift estimated by the UE receiver is different than the actual Doppler shifts from the different RRHs. For example, the UE receiver on the train is traveling in different directions with respect to each TRP. Therefore, the Doppler shifts experienced by the UE receiver, which correspond to the transmissions from the different TRPs, are different. For example, the UE receiver may experience a first Doppler shift from the transmission of a signal from a first TRP, and the UE receiver may experience a second Doppler shift from the transmission of a signal from a second TRP. However, conventional approaches do not have the support or mechanisms to estimate these Doppler shifts separately. Rather, in some conventional approaches, the UE receiver may perceive a single composite signal that is the sum of the signals arriving from the different TRPs. Then, the UE receiver may perform a composite Doppler shift estimate, which does not correspond to either of the actual Doppler shifts from the different TRPs, thereby leading to degraded UE receiver performance.

SUMMARY

According to an aspect, a method for frequency offset reporting includes transmitting, by a first transceiver of a base station, a first tracking reference signal to a user device in a wireless communication system, transmitting, by a second transceiver of the base station, a second tracking reference signal to the user device, and receiving, by the base station, a channel state information (CSI) reporting signal via an uplink channel, where the CSI reporting signal includes power estimation information, and the power estimation information has been estimated by the user device using the first and second tracking reference signals. The method includes determining whether to pre-compensate a frequency of a downlink signal with frequency offset information based on the power estimation information, and transmitting, by at least one of the first transceiver or the second transceiver, the downlink signal with the pre-compensated frequency in response to the determination to pre-compensate the frequency of the downlink signal.

According to some aspects, the method may include any one or more of the following features (or any combination thereof). The CSI reporting signal includes the frequency offset information, where the frequency offset information has been estimated by the user device using the first and second tracking reference signals. The method may include receiving, by the base station, first and second uplink reference signals, and estimating, by the base station, the frequency offset information using the first and second uplink reference signals. The first and second uplink reference signals may include sounding reference signals. The power estimation information includes a first power estimation value associated with the first tracking reference signal, and a second power estimation value associated with the second tracking reference signal. The method may include computing a difference between the first power estimation value and the second power estimation value, comparing the difference to a power estimation threshold, determining to pre-compensate the frequency of the downlink signal with the frequency offset information in response to the difference being less than the power estimation threshold, transmitting an activation signal to the user device, the activation signal indicating that frequency pre-compensation is activated, and/or transmitting, by the first transceiver and the second transceiver, the downlink signal with the pre-compensated frequency. The method may include transmitting, by the base station, a radio resource control (RRC) message during an RRC configuration procedure, where the RRC message includes the power estimation threshold. The method may include transmitting, by the base station, a downlink control information (DCI) message, where the DCI message includes the activation signal. The method may include determining to not pre-compensate the frequency of the downlink signal with the frequency offset information in response to the difference being greater than the power estimation threshold, and transmitting, by the first transceiver and the second transceiver, the downlink signal at a carrier frequency. The user device may be configured with a first transmission configuration indicator (TCI) state and a second TCI state. The method may include selecting, by the base station, the first TCI state in response to the first power estimation value being greater than the second power estimation value, and transmitting, by the base station, a signal indicating activation of the first TCI state such that activation of the first TCI state causes the user device to use the first tracking reference signal as source signal for the frequency offset information at the user device. The method may include determining to pre-compensate the frequency of the downlink signal with the frequency offset information in response to the difference being greater than the power estimation threshold, and selecting one of the first transceiver and the second transceiver to transmit the downlink signal with the pre-compensated frequency based on the power estimation information. The CSI reporting signal identifies an anchor tracking reference signal, where the anchor tracking reference signal is used as a reference for centering a carrier of the user device, and the anchor tracking reference signal is one of the first tracking reference signal or the second tracking reference signal. The method may include transmitting, by the base station, a radio resource control (RRC) message during an RRC configuration procedure, where the RRC message includes a first tracking reference signal (TRS) resource set and a second TRS resource set, and the first and second TRS resource sets is associated with CSI report configuration data. The RRC message includes one or more sounding reference signal (SRS) resource sets, where the one or more SRS resource sets is associated with the first and second TRS resource sets.

According to an aspect, a method for frequency offset reporting includes receiving, by a user device from a first transceiver of a base station, a first tracking reference signal, receiving, by the user device from a second transceiver of the base station, a second tracking reference signal, estimating power estimation information using the first and second tracking reference signals, and transmitting, by the user device, a channel state information (CSI) reporting signal via an uplink channel, where the CSI reporting signal includes the power estimation information, and the power estimation information is configured to be used by the base station to determine whether to pre-compensate a frequency of a downlink signal with frequency offset information.

According to some aspects, the method may include one or more of the following features (or any combination thereof). The method may include estimating, by the user device, the frequency offset information using the first and second tracking reference signals, where the CSI reporting signal includes the frequency offset information such that a first frequency offset value and a second frequency offset value are used to pre-compensate the frequency of the downlink signal. The method may include transmitting, by the user device, a first uplink reference signal to the first transceiver, and transmitting, by the user device, a second uplink reference to the second transceiver, where the first and second uplink reference signals are used to estimate the frequency offset information at the base station. The method may include receiving, by the user device, a first downlink signal with a pre-compensated frequency from the first transceiver, and receiving, by the user device, a second downlink signal with a pre-compensated frequency from the second transceiver. The frequency offset information includes a first frequency offset value corresponding to the first tracking reference signal and a first transmission configuration indicator (TCI) state, where the frequency offset information includes a second frequency offset value corresponding to the second tracking reference signal and a second TCI state. The power estimation information includes a first power estimation value corresponding to the first tracking reference signal and a second power estimation value corresponding to the second tracking reference signal. The method may include receiving, by the user device, the downlink signal at a carrier frequency from the base station, activating, by the user device, the second TCI state in response to the second power estimation value being greater than the first power estimation value, and performing demodulation of a downlink channel using the second frequency offset value. The method may include receiving, by the user device, a radio resource control (RRC) message during an RRC configuration procedure, where the RRC message includes a power estimation threshold, and the power estimation threshold is configured to be compared with the power estimation information. The CSI reporting signal may identify an anchor tracking reference signal, where the anchor tracking reference signal is used as a reference for centering a carrier of the user device, and the anchor tracking reference signal is one of the first tracking reference signal or the second tracking reference signal. The method may include receiving, by the user device, a radio resource control (RRC) message during an RRC configuration procedure, where the RRC message includes a first tracking reference signal (TRS) resource set and a second TRS resource set, and the first and second TRS resource sets are associated with CSI report configuration data. The RRC message may include one or more sounding reference signal (SRS) resource sets, where the one or more SRS resource sets are associated with the first and second TRS resource sets.

According to some aspects, a non-transitory computer-readable storage medium comprising instructions stored thereon that, when executed by at least one processor, are configured to cause a computing system to perform any of the above features. According to some aspects, an apparatus comprising at least one processor, and at least one memory including computer program code, the at least one memory and the computer program code configured to, with the at least one processor, cause the apparatus at least to perform any of the above features. According to some aspects, an apparatus comprising means for performing any of the above features.

The details of one or more examples of implementations are set forth in the accompanying drawings and the description below. Other features will be apparent from the description and drawings, and from the claims.

BRIEF DESCRIPTION OF THE DRAWINGS

FIG. 7 illustrates a flowchart depicting example operations of a wireless communication system with Doppler shift reporting according to an example implementation.

DETAILED DESCRIPTION

Figure 1:
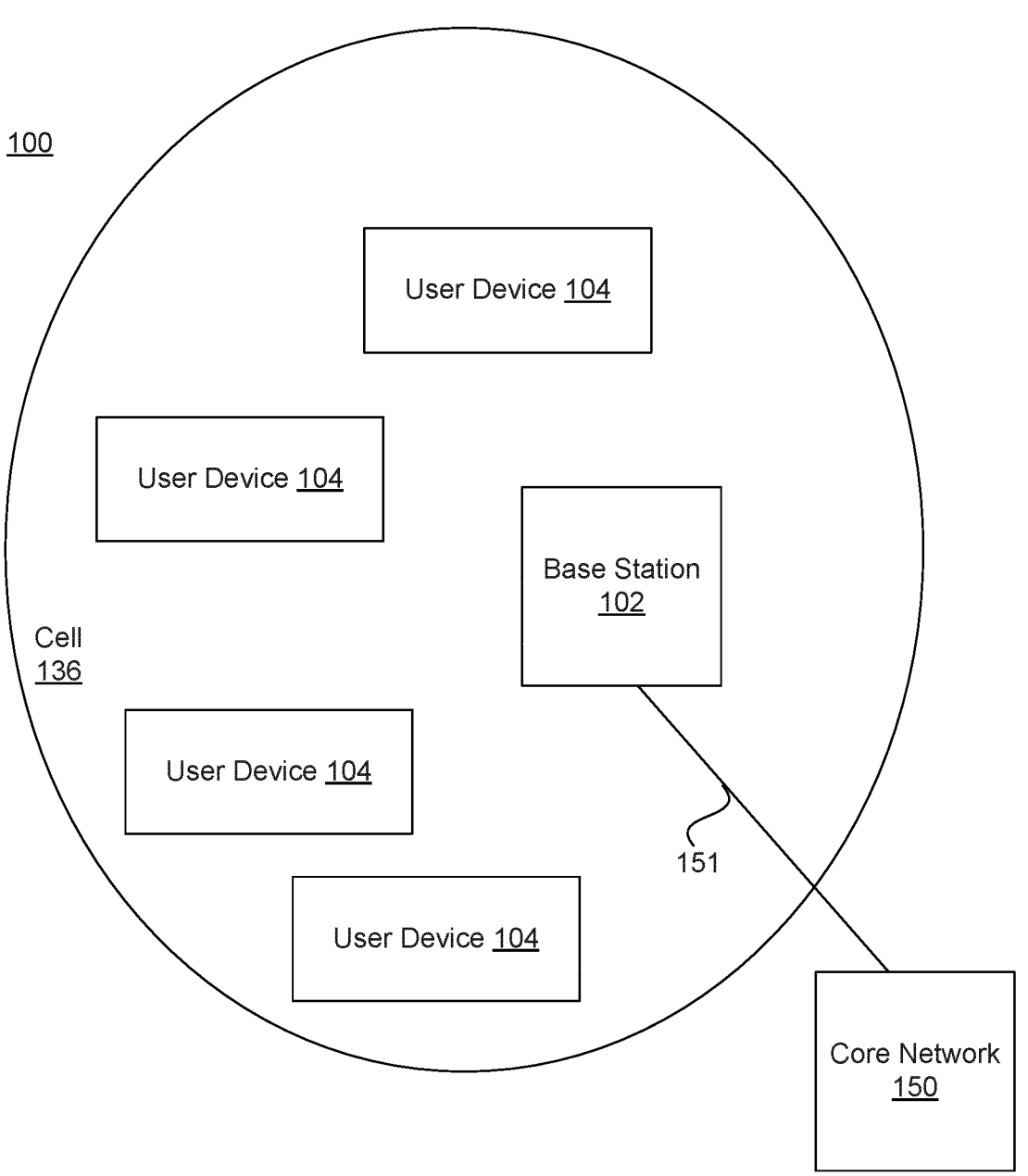
FIG. 1 illustrates a wireless communication system according to an example implementation.

The present disclosure relates to a system and/or method for associating tracking reference signal (TRS) resource sets to channel state information (CSI) configuration data, where, when configured at the user device, the user device is configured to report frequency offset values and/or power estimation values (e.g., reference signal received power (RSRP) values) to enable Doppler shift pre-compensation during a HST-SFN deployment scenario. In some examples, the TRS resources sets (and associated CSI configuration data) are transmitted to the user device during a radio resource control (RRC) procedure. In some examples, the TRS resource sets include a first TRS resource set associated with a first transceiver (e.g., a transmit-receive-point (TRP) or first radio resource head (RRH)), and a second TRS resource set associated with a second transceiver (e.g., a second TRP or second RRH). Each of the first TRS resource set and the second TRS resource set is associated with a single CSI configuration.

The TRS signal is configured as a non-zero-power (NZP)-CSI-resource, and the CSI report quantities are the user device's power estimation values (e.g., RSRP values) and/or frequency offset values. In some examples, the first transceiver is configured to transmit a first tracking reference signal (e.g., also referred to as first TRS signal), and the second transceiver is configured to transmit a second tracking reference signal (e.g., also referred to as second TRS signal), where each of the first and second TRS signals is transmitted at the same carrier frequency. The periodic (or aperiodic) transmission of the reference signals (e.g., the TRS signals) causes the user device to estimate and report frequency offset values and/or power estimation values based on the TRS signals.

In some examples, the frequency offset values and the power estimation values are estimated from the TRS signals and reported by the user device via an uplink channel (e.g., physical uplink control channel (PUCCH), or physical uplink shared channel (PUSCH)). The estimation and reporting of the frequency offset values by the user device may be referred to explicit Doppler shift reporting. In some examples, the frequency offset includes Doppler shift and/or UE/gNB oscillator frequency drifts. In some examples, the power estimation values are estimated and reported by the user device, and the base station estimates the frequency offset values based on uplink reference signals (e.g., sounding reference signals (SRSs)) transmitted by the user device. The estimation of the frequency offset values by the base station using the uplink reference signals may be referred to implicit Doppler shift reporting.

The base station may use the frequency offset values to pre-compensate downlink (DL) signals (e.g., PDCCH, PDSCH, demodulation reference signal (DMRS), etc.). For example, based on the frequency offset values, frequency pre-compensation is performed at each of the transceivers (e.g., the first transceiver and the second transceiver). The frequency shift that the user device would experience (corresponding to each transceiver) is estimated beforehand, and this frequency offset is pre-compensated, which means, in some examples, that the signal arriving at the user device from each transceiver does not have a Doppler shift. In some examples, the signal arriving at the user device from each transceiver does have a frequency offset but the frequency offset is the same frequency offset from both transceivers. Accordingly, if the train is near the midtrack point between two transceivers, the user device's performance may be improved due to the Doppler shift pre-compensation.

In some examples, the power estimation values (e.g., RSRP values) are used to determine whether pre-compensation should be applied to the DL signals and/or whether to use one of multiple transmission schemes. The transmission schemes may include single frequency network (SFN) transmission in which a signal is transmitted by two or more transceivers, or single transceiver transmission in which a signal is transmitted by one transceiver. The power estimation values may include a first power estimation value (e.g., a first RSRP value) estimated from the first TRS signal transmitted by the first transceiver, and a second power estimation value (e.g., a second RSRP value) estimated from the second TRS signal transmitted by the second transceiver. The base station may compare a difference of these power estimation values (e.g., $delta_{RSRP}$) with a pre-defined power estimation threshold. If the $delta_{RSRP}$ is less than the power estimation threshold (which indicates that the user device is near the track midpoint (e.g., between two transceivers)), the base station may enter a pre-compensation mode in which the frequency of the DL signals are pre-compensated with the frequency offset values, and these pre-compensated signals are transmitted via an SFN transmission scheme.

In some examples, the CSI report also identifies an anchor TRS (e.g., one of the first TRS resource set and the second TRS resource set) whose received frequency is used as a reference for centering the user device's carrier. In some examples, the CSI report identifies the frequency offset values, the power estimation values, and the anchor TRS. In some examples, the user device is configured to center its downlink/uplink (DL/UL) carrier frequency on the frequency of the strongest reference signals. For example, if the power estimation value associated with the first transceiver (or first TRS signal) is higher than the power estimation value associated with the second transceiver (or second TRS signal), the user device is configured to center its DL/UL carrier frequency using the carrier frequency plus the frequency offset associated with the first transceiver (or first TRS signal).

In some examples, if the $delta_{RSRP}$ is greater than the power estimation threshold (which indicates that the user device is near one of the transceivers), the base station may enter a non-pre-compensation mode in which the frequency of the DL signals are not compensated with the frequency offset values, and these non-compensated signals are transmitted via an SFN transmission scheme. In this example, the user device performs Doppler estimation using either the frequency offset value associated with the first transceiver or the frequency offset value associated with the second transceiver. In some examples, the user device uses the frequency offset value from the transceiver having the highest power estimation value (e.g., the highest RSRP value) for its frequency offset estimation. In some examples, the base station notifies the user device which frequency offset value to use for demodulating DL channels by way of transmission configuration indicator (TCI) state activation. For example, the user device may be configured with two TCI states (e.g., a first TCI state corresponding to the first transceiver and a second TCI state corresponding to the second transceiver), where the base station's activation of the first TCI state would indicate to use the frequency offset value associated with the first transceiver or the base station's activation of the second TCI state would indicate to use the frequency offset value associated with the second transceiver. In some examples, the TCI state associated with the highest power estimation value (e.g., the highest RSRP value) is autonomously selected by the user device. In some examples, the power estimation threshold is transmitted to the user device via an RRC message, which may allow for autonomous activation of TCI states.

In some examples, if the $delta_{RSRP}$ is greater than the power estimation threshold (which indicates that the user device is near one of the transceivers), the base station may enter a pre-compensation mode in which the frequency of a DL signal is compensated with the frequency offset value, and this pre-compensated signal is transmitted via a single transceiver transmission scheme. For example, if the first transceiver has a higher power estimation value than the second transceiver, frequency pre-compensation is performed using the frequency offset associated with the first transceiver and the first transceiver transmits the pre-compensated DL signal (not the second transceiver).

The implicit Doppler reporting may operate in the same/similar manner as compared to the explicit Doppler reporting as explained above. However, for implicit Doppler reporting, the frequency offset values are not estimated by the user device, but rather the base station estimates the frequency offset values based on uplink reference signals (e.g., SRS signals). In some examples, two SRS resource sets are associated with the TRS resource sets, which, when configured at the user device, causes the user device to transmit a first SRS signal to the first transceiver and a second SRS signal to the second transceiver. The transceivers may estimate the frequency offset values using the SRS signals. In some examples, a single SRS resource set is associated with the TRS resource sets. In some examples, the SRS resource sets may be considered semi-persistent or aperiodic, where when pre-compensation is not applied (e.g., $delta_{RSRP}$ is greater than the power estimation threshold), the SRS resource sets may be deactivated. However, when pre-compensation is applied, the SRS resources sets may be re-activated. In some examples, the activation/deactivation may be controlled by the base station by sending activation or deactivation commands. In some examples, the activation/deactivation may be controlled by the user device based on a comparison of $delta_{RSRP}$ with the power estimation threshold. These and other features are further described with reference to the figures.

FIG. 1 is a block diagram of a wireless communication system 100 according to example implementation. The wireless communication system 100 includes a base station 102 configured to be connected to a plurality of user devices 104. The base station 102 provides wireless coverage within a cell 136, including to the user devices 104. Although four user devices 104 are shown as being connected or attached to the base station 102, any number of user devices 104 may be provided. The base station 102 is also connected to a core network 150 via an interface 151. In some examples, the interface 151 may be an S1 interface or NG interface.

The user devices 104 may also be referred to as mobile stations or user equipments. The base station 102 may also be referred to as an access point (AP), an enhanced Node B (eNB), a base station, next generation Node B (gNB), a next generation enhanced Node B (ng-eNB), or a network node. The terms user device and user equipment may be used interchangeably. A base station 102 may also include or may be referred to as a radio access network (RAN) node, and may include a portion of a base station or a portion of a RAN node (e.g., such as a centralized unit (CU) and/or a distributed unit (DU) in the case of a split base station). At least part of the functionalities of a base station 102 may also be carried out by any node, server or host which may be operably coupled to a transceiver, such as a remote radio head.

In some examples, a base station (BS) node (e.g., the base station 102) may be part of a mobile telecommunication system. A RAN (radio access network) may include one or more BSs or RAN nodes that implement a radio access technology, e.g., to allow one or more user devices 104 to have access to a network or the core network 150. Thus, for example, the RAN (RAN nodes, such as BSs or gNBs) may reside between one or more user devices 104 and a core network 150. In some examples, each RAN node (e.g., BS, eNB, gNB, CU/DU, etc.) or BS may provide one or more wireless communication services for one or more user devices 104, e.g., to allow the user devices 104 to have wireless access to a network, via the RAN node. Each RAN node or BS may perform or provide wireless communication services, e.g., such as allowing the user devices 104 to establish a wireless connection to the RAN node and sending data to and/or receiving data from one or more of the user devices 104. For example, after establishing a connection to a user device 104, a RAN node (e.g., BS, eNB, gNB, CU/DU, etc.) may forward data to the user device 104 that is received from a network or the core network 150, and/or forward data received from the user device 104 to the network or core network 150. RAN nodes (e.g., BS, eNB, gNB, CU/DU, etc.) may perform a wide variety of other wireless functions or services, e.g., such as broadcasting control information (e.g., such as system information) to the user devices 104, paging the user devices 104 when there is data to be delivered to the user device 104, assisting in handover of a user device 104 between cells, scheduling of resources for uplink data transmission from the user device(s) 104 and downlink data transmission to the user device(s) 104, sending control information to configure one or more user devices 104, and the like. These are a few examples of one or more functions that a RAN node or BS may perform. A base station 102 may also be a DU (Distributed Unit) part of an IAB (Integrated Access and Backhaul) node (a.k.a., a relay node). The DU facilitates the access link connection(s) for an IAB node.

A user device 104 (e.g., user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device 104 may also be (or may include) a nearly exclusive uplink only device, of which an example is a camera or video camera loading images or video clips to a network. A user device 104 may be also MT (Mobile Termination) part of IAB (Integrated Access and Backhaul) node (a.k.a., a relay node). MT facilitates the backhaul connection for an IAB node.

In LTE (as an illustrative example), the core network 150 may be referred to as Evolved Packet Core (EPC), which may include a mobility management entity (MME) which may handle or assist with mobility/handover of user devices between base stations 102, one or more gateways that may forward data and control signals between the base stations 102 and packet data networks or the Internet, and other control functions or blocks. Other types of wireless networks, such as 5G (which may be referred to as New Radio (NR)) may also include a core network 150.

In addition, by way of illustrative example, the various example embodiments or techniques described herein may be applied to various types of user devices or data service types or may apply to user devices 104 that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

Figure 2A:
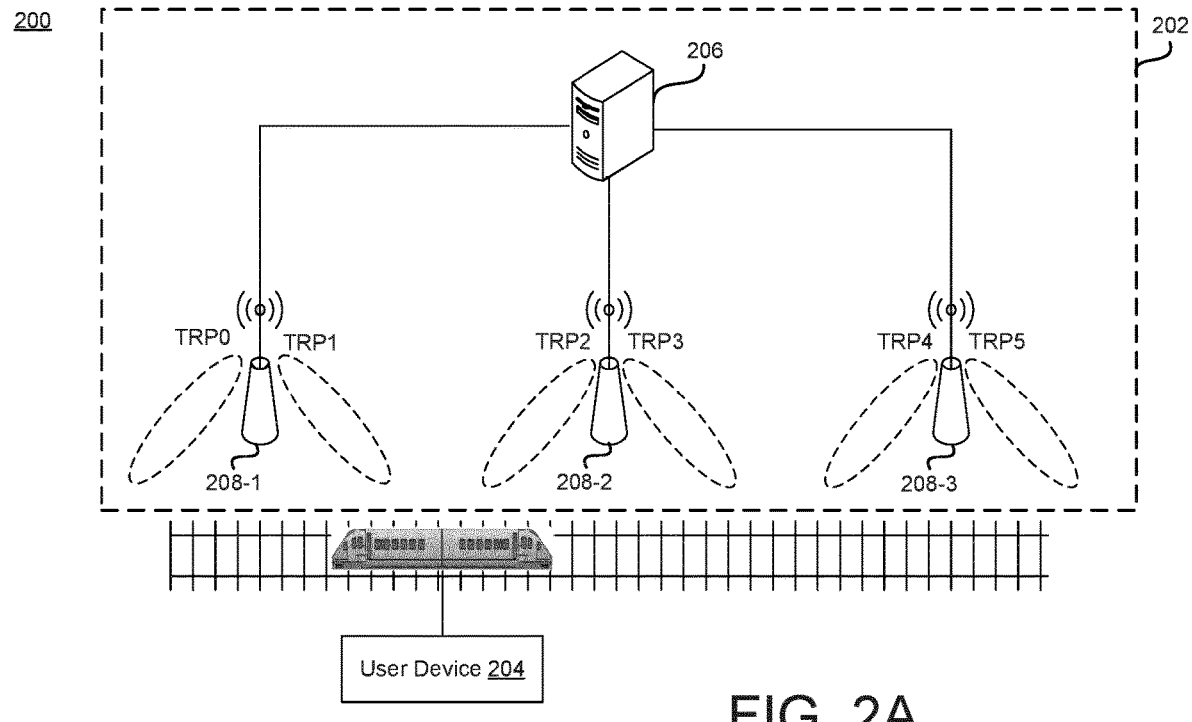
FIG. 2A illustrates a wireless communication system with Doppler shift reporting according to an example implementation.
Figure 2B:
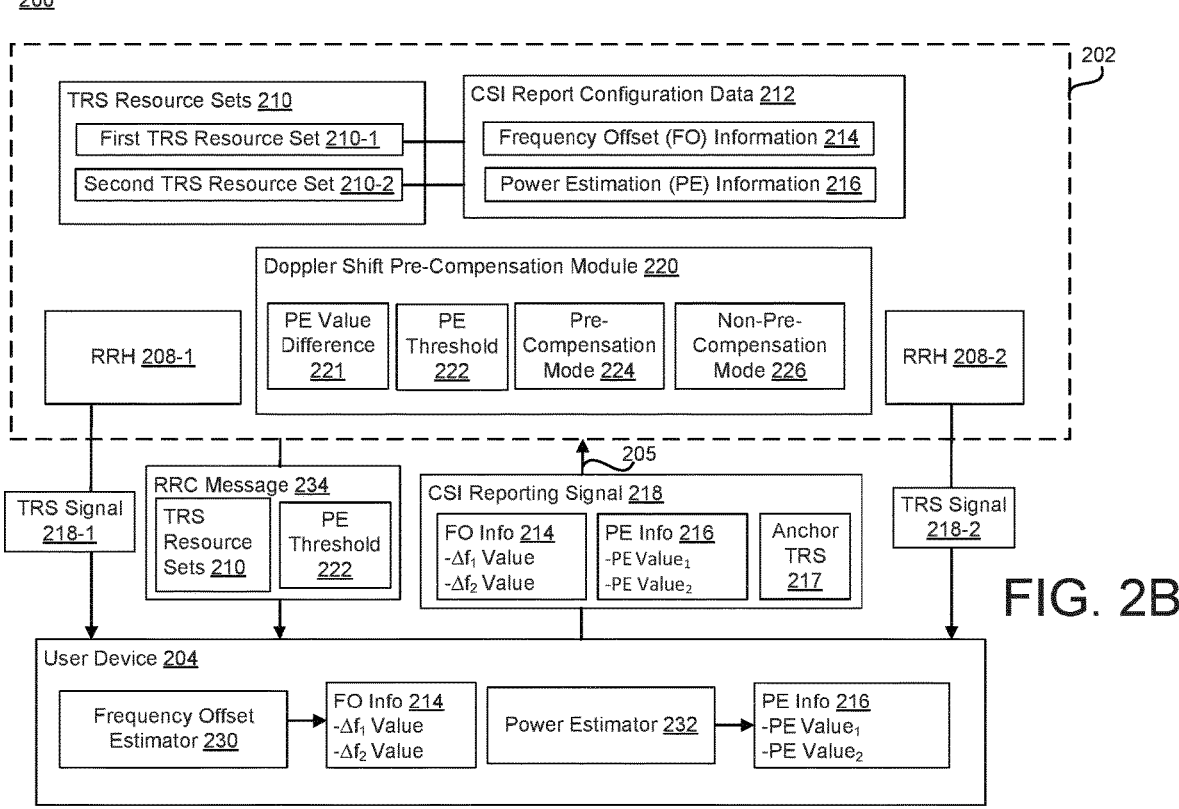
FIG. 2B illustrates a wireless communication system with Doppler shift reporting according to another example implementation.

FIGS. 2A through 2B illustrate a wireless communication system 200 for configuring a user device 204 to report the values for frequency offset information 214 and the values for power estimation information 216 to enable Doppler shift pre-compensation during an HST-SFN deployment scenario. The wireless communication system 200 may be considered an example of explicit Doppler reporting. The wireless communication system 200 may be an example of the wireless communication system 100 of FIG. 1 and may include any of the details discussed with reference to that figure.

The wireless communication system 200 includes a base station 202 having multiple remote radio heads (RRHs) such as a first RRH 208-1, a second RRH 208-2, and a third RRH 208-3. The wireless communication system 200 includes a baseband central unit (BBU) 206 connected to the first RRH 208-1, the second RRH 208-2, and the third RRH 208-3. In some examples, the base station 202 is considered a distributed base station (e.g., a distributed gNB). In some examples, the different RRHs may be considered separate base stations (e.g., gNBs). Each RRH may function as transmit receive points (TRPs) connected to the same BBU 206. The first RRH 208-1 may define two transmit receive points (TRPs), e.g., TRP0 and TRP1. The second RRH 208-2 may define two TRPs, e.g., TRP2 and TRP3. The third RRH 208-3 may define two TRPs, e.g., TRP4 and TRP5. In some examples, the TRPs are considered different transceivers, where the term TRP and transceiver may be used interchangeably.

An HST-SFN deployment scenario may refer to the scenario where a user device 204 inside of a train is served by multiple transceivers that operate as a network at a single frequency. As indicated above, when the train is at the midtrack point between two transceivers (e.g., between TRP1 and TRP2), the LOS tap of the channel impulse response contains two contributions with different Doppler shifts (e.g., very different Doppler shifts), which can cause problems when estimating Doppler frequency offset at the user device 204.

However, as discussed below, the techniques discussed herein provide a Doppler shift reporting mechanism that allows the base station 202 to enable doppler shift pre-compensation. For example, the base station 202 may associate multiple TRS resource sets 210 with CSI report configuration data 212. The TRS resource sets 210 may include a first TRS resource set 210-1 that is associated with the first transceiver (e.g., the first RRH 208-1 or TRP1) and a second TRS resource set 210-2 that is associated with the second transceiver (e.g., the second RRH 208-2 or TRP2). Each of the first TRS resource set 210-1 and the second TRS resource set 210-2 is associated with a single CSI report configuration, which, when configured at the user device 204, causes the user device 204 to report frequency offset information 214 and power estimation information 216 via a CSI reporting signal 218 on an uplink channel 205, where the values for the frequency offset information 214 and the power estimation information 216 have been estimated using TRS signals (e.g., first TRS signal 218-1, second TRS signal 218-2).

The base station 202 is configured to transmit the TRS resource sets 210 (e.g., the first TRS resource set 210-1 and the second TRS resource set 210-2) in an RRC message 234 to the user device 204 during an RRC configuration procedure. The first TRS resource set 210-1 may define the parameters for transmitting/receiving TRS signal 218-1 via the user device 204 and the first transceiver. The second TRS resource set 210-2 may define the parameters for transmitting/receiving the TRS signal 218-2 via the user device 204 and the second transceiver. During an RRC procedure, the base station 202 may transmit the TRS resources 210 (and CSI report configuration data 212) to the user device 204. In some examples, the first TRS resource set 210-1 and the second TRS resource set 210-2 are transmitted on different time-frequency resources (e.g., non-SFN signals). Then, the base station 202 is configured to transmit TRS signals from the different transceivers to the user device 204. A TRS signal may be considered a CSI reference signal that is configured to be periodically (or aperiodically) transmitted to the user device 204 for Doppler shift, Doppler spread and/or time offset estimation. In some examples, the minimum periodicity for a TRS signal is equal to ten milliseconds and the time-domain locations of the TRS resources in a slot can be different and depending on the considered frequency range of operation.

In some examples, the first transceiver (e.g., TRP1) of the first RRH 208-1 is configured to transmit a TRS signal 218-1 at carrier frequency $f_c$, and the second transceiver (e.g., TRP2) of the RRH 208-2 is configured to transmit a TRS signal 218-2 at carrier frequency $f_c$. The TRS signal 218-1 is received at the user device 204 at frequency $f_c + \Delta f_1$. The TRS signal 218-2 is received at the user device 204 at frequency $f_c + \Delta f_2$. $\Delta f_1$ indicates the frequency offset (or the Doppler offset) associated with a signal transmitted by the first transceiver and received by the user device 204. $\Delta f_2$ indicates the frequency offset (or the Doppler offset) associated with a signal transmitted by the second transceiver and received by the user device 204.

The user device 204 includes a frequency offset estimator 230 that estimates the values (e.g., $\Delta f_1$, $\Delta f_2$) of the frequency offset information 214 using the first TRS signal 218-1 and the second TRS signal 218-2. For example, using the TRS signal 218-1, the frequency offset estimator 230 may estimate the value (e.g., $\Delta f_1$) associated with the first transceiver. Using the TRS signal 218-2, the frequency offset estimator 230 may estimate the value (e.g., $\Delta f_2$) associated with the second transceiver. The frequency offset information 214 includes $\Delta f_1$ and $\Delta f_2$. The user device 204 includes a power estimator 232 configured to estimate the power estimation information 216. In some examples, the power estimation information 216 includes RSRP information. The power estimation information 216 may include a power estimation value$_1$ corresponding to the estimated power associated with the first TRS signal (or the first transceiver) and a power estimation value$_2$ corresponding to the estimated power associated with the second TRS signal (or the second transceiver). For example, using the TRS signal 218-1, the power estimator 232 may estimate the power estimation value$_1$ (e.g., $RSRP_1$ value) associated with the first transceiver. Using the TRS signal 218-2, the power estimator 232 may estimate the power estimation value$_2$ (e.g., $RSRP_2$ value) associated with the second transceiver.

Then, the user device 204 reports the frequency offset information 214 and the power estimation information 216 via the CSI reporting signal 218 on the uplink channel 205. In some examples, the power estimation information 216 included in the CSI reporting signal 218 includes power estimation value$_1$ and power estimation value$_2$, where the base station 202 computes the power estimation value difference 221, as shown in FIG. 2B. In other examples, the power estimator 232 at the user device 204 computes the power estimation value difference 221, and the power estimation information 216 included in the CSI reporting signal 218 includes the power estimation value difference 221 (which may be addition to or instead of the individual power estimation values). As indicated above, the power estimation value difference 221 is the difference between the power estimation value$_1$ and power estimation value$_2$. In some examples, the uplink channel 205 is a physical uplink control channel (PUCCH). In some examples, the uplink channel 205 is a physical uplink shared channel (PUSCH). The base station 202 may receive the CSI reporting signal 218 on the uplink channel 205 via the first transceiver and/or the second transceiver. The base station 202 may use the frequency offset information 214 and the power estimation information 216 to enable Doppler shift pre-compensation during an HST-SFN deployment scenario. For example, the base station 202 may include a doppler shift pre-compensation module 220. In some examples, the doppler shift pre-compensation module 220 may compute the power estimation value difference 221 based on the power estimation value$_1$ and the power estimation value$_2$.

The base station 202 determines whether or not to apply pre-compensation based on the power estimation information 216 (e.g., the power estimation value difference 221 or delta$_{RSRP}$) In some examples, the doppler shift pre-compensation module 220 may compare a power estimation threshold 222 to the power estimation value difference 221. For instance, if the difference between the power estimation value$_1$ and the power estimation value$_2$ is relatively small, it may indicate that the user device 204 on the train is near the midpoint between the first transceiver and the second transceiver.

If the power estimation value difference 221 is below the power estimation threshold 222, the doppler shift pre-compensation module 220 may enter a pre-compensation mode 224 in which pre-compensated versions are transmitted by the transceivers (e.g., TRP1, TRP2) using SFN transmission. As indicated above, SFN transmission may refer to the transmission of signals at a single frequency using multiple transceivers (e.g., TRP1 and TRP2). For example, the base station 202 may use the frequency offset values (e.g., $\Delta f_1$ and $\Delta f_2$) to pre-compensate downlink (DL) signals (e.g., PDCCH, PDSCH, demodulation reference signal (DMRS), etc.). For example, based on the frequency offset values (e.g., $\Delta f_1$ and $\Delta f_2$), frequency pre-compensation is performed at each of the transceivers (e.g., TRP1 and TRP2). The frequency shift that the user device 204 would experience (corresponding to each transceiver) is estimated beforehand, and this frequency offset is pre-compensated, which means, in some examples, that the signal arriving at the user device 204 from each transceiver does not have a Doppler shift. In some examples, the signal arriving at the user device 204 from each transceiver does have a frequency offset but the frequency offset is the same frequency offset from both transceivers. Accordingly, if the train is near the midtrack point between two transceivers, the user device's performance may be improved due to the Doppler shift pre-compensation.

In the pre-compensation mode 224, using SFN transmission, the first transceiver (e.g., TRP1) of the RRH 208-1 may transmit a pre-compensated DL signal, and the second transceiver (e.g., TRP2) of the RRH 208-2 may transmit a pre-compensated DL signal. In the pre-compensation mode 224, the base station 202 may use the reported values of the frequency offset information to pre-compensate the carrier frequency of downlink signals. For example, each transceiver may transmit a frequency pre-compensated version of the downlink signals which will arrive at the user device 204 with the same frequency. In particular, the base station 202 may use to the value of $\Delta f_1$ to adjust the frequency of a downlink signal transmitted by the first transceiver (e.g., TRP1) and the value of $\Delta f_2$ to adjust the frequency of a downlink signal transmitted by the second transceiver (e.g., TRP2) such that the downlink signals will arrive at the user device 204 with the same frequency. In some examples, in the pre-compensation mode 224, the CSI reporting signal 218 also identifies an anchor TRS 217 (e.g., one of the first TRS resource set 210-1 and the second TRS resource set 210-2) whose received frequency is used as a reference for centering the user device's carrier. In some examples, the CSI reporting signal identifies the frequency offset values, the power estimation values (e.g., RSRP values), and the anchor TRS 217. In some examples, the user device 204 is configured to center its DL/UL carrier frequency on the frequency of the strongest reference signals. For example, if the power estimation value$_1$ is higher than the power estimation value$_2$, the user device 204 is configured to center its DL/UL carrier frequency using the carrier frequency plus the frequency offset associated with the first transceiver (e.g., TRP1).

In some examples, if the power estimation value difference 221 is above the power estimation threshold 222, the doppler shift pre-compensation module 220 may enter a non-pre-compensation mode 226. In some examples, in the non-pre-compensation mode 226, downlink signals transmitted by the transceivers (e.g., TRP1, TRP2) are not pre-compensated. In some examples, in the non-pre-compensation mode 226, the downlink signals are transmitted via SFN transmission.

In this example, the user device 204 performs the Doppler estimation using either the frequency offset value ($\Delta f_1$) associated with the first transceiver (e.g., TRP1) or the frequency offset value ($\Delta f_2$) associated with the second transceiver. In some examples, the user device 204 uses the frequency offset value from the transceiver having the highest power estimation value for demodulation of DL channels. In some examples, the base station 202 notifies the user device 204 which frequency offset value to use for demodulation of DL channels by way of TCI state activation. For example, the user device 204 would be configured with two TCI states (e.g., a first TCI state corresponding to the first transceiver and a second TCI state corresponding to the second transceiver), where the base station's activation of the first TCI state would indicate to use the frequency offset value associated with the first transceiver or the base station's activation of the second TCI state would indicate to use the frequency offset value associated with the second transceiver. In some examples, the TCI state associated with the highest power estimation value (e.g., RSRP value) is selected. In some examples, the power estimation threshold 222 is transmitted to the user device via an RRC message 234, which may allow for autonomous selection of TCI states.

In some examples, if the power estimation value difference 221 is above the power estimation threshold 222, the doppler shift pre-compensation module 220 may enter the pre-compensation mode 224 but the base station 202 transmits a pre-compensated DL signal using only the transceiver associated with the strongest (or highest) power estimation value. For example, the base station 202 may switch to single transceiver transmission (e.g., dynamic point selection (DPS) (e.g., instead of using SFN transmission)), where one transceiver is configured to transmit a pre-compensated DL signal. For example, if the power estimation value difference 221 is above the power estimation threshold 222 and the power estimation value$_1$ is higher than the power estimation value$_2$, the base station 202 may cause a DL signal to be transmitted to the user device 204 via the first transceiver (TRP1) (but not the second transceiver (TRP2)).

Figure 3:
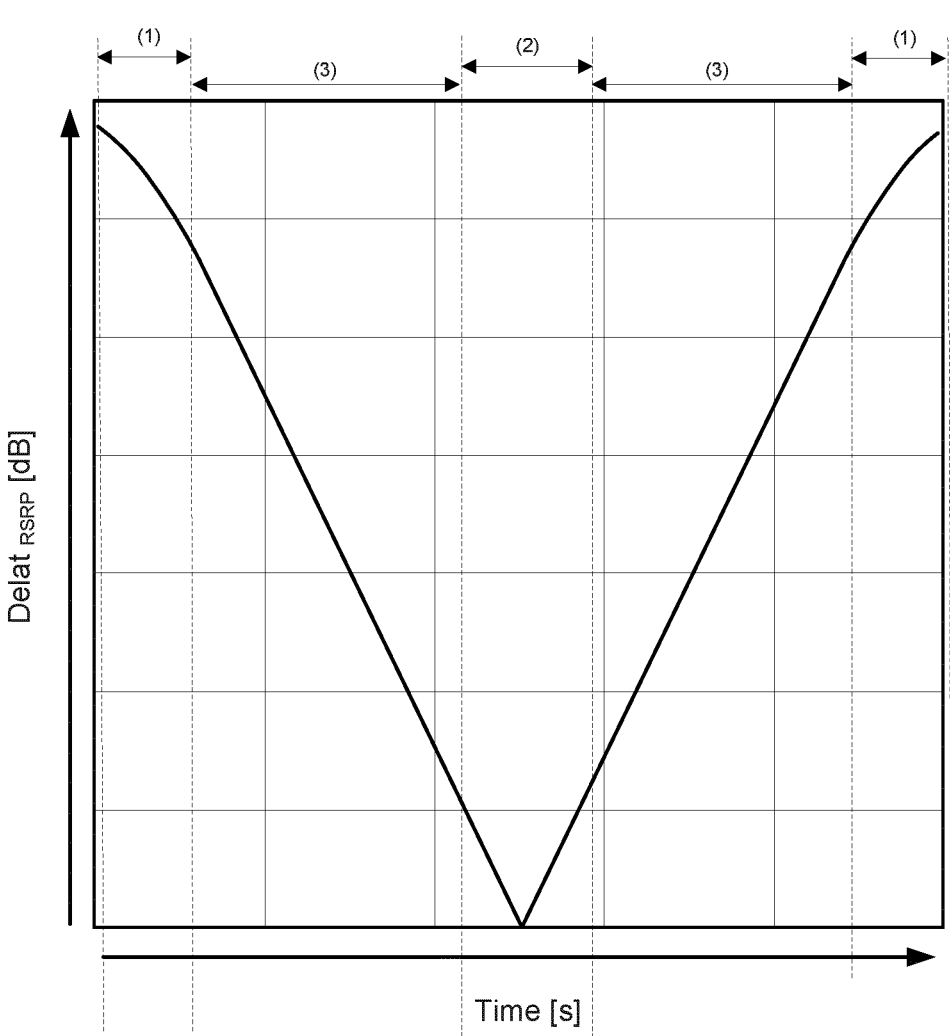
FIG. 3 illustrates a graph depicting a difference in power estimation values over time according to an example implementation.

FIG. 3 illustrates a graph 300 depicting values of delta$_{R\text{-}SRP}$ over time according to an example implementation. The graph 300 plots the delta$_{RSRP}$ (e.g., LOS RSRP) experienced by the user device over time. Although the graph 300 is explained with reference to the wireless communication system 200 of FIGS. 2A and 2B, the graph 300 may be applicable to any of the embodiments discussed herein.

As shown in FIG. 3, the user device 204 may experience a large link imbalance (e.g., large delta$_{RSRP}$) twice when moving from TRP1 (e.g., the first transceiver) to TRP2 (e.g., the second transceiver). For the reasons mentioned above, the base station 202 may pause frequency pre-compensation in these cases, requiring it to be switched on/off when the delta$_{RSRP}$ is found to be below/above a threshold. Alternatively, the base station 202 may switch between SFN transmission and dynamic point selection (DPS) (also referred to as single transceiver transmission mode) such that signals are transmitted only from the transceiver with the better link while keeping frequency pre-compensation on when the delta$_{RSRP}$ is found to be below/above a threshold. The region of vulnerability may lie not in the extreme cases of delta$_{RSRP}$ but somewhere in the middle of the range of values observed. Thus, there are three regions within the range of delta$_{RSRP}$ values between the maximum value and zero to consider corresponding to three zones (e.g., (1), (2), (3)) on the track.

In zone (1), the user device 204 is close to one transceiver, and therefore the delta$_{RSRP}$ is at or close to the maximum value. Although the Doppler shift estimate from the farther transceiver may have poorer accuracy, the signal transmitted from the farther transceiver is also relatively much weaker than that transmitted by the closer transceiver. Therefore, neglecting the signal from the farther transceiver with frequency pre-compensation at the network turned off, may not significantly affect demodulation performance. On the other hand, inaccurate frequency pre-compensation for the farther transceiver (with frequency pre-compensation at the network turned on for SFN transmission) may also not significantly affect demodulation performance. In some examples, the actual Doppler shift experienced by the UE changes fast (e.g., very fast), leading to possible inaccuracies in typical time-averaged Doppler shift estimation and pre-compensation.

In zone (2), the user device 204 is close to the mid-track point, where delta$_{RSRP}$ is equal to or close to zero. Both links are of similar strength and the estimates of the Doppler shifts have similar accuracy. In this case, it may be beneficial to have SFN transmission with frequency pre-compensation.

In zone (3), the user device 204 is between a transceiver and the midtrack point, where delta$_{RSRP}$ is within a range of values for which the transmission from the farther transceiver still contributes (e.g., contributes significantly) to the received signal and therefore SFN transmission with inaccurate frequency pre-compensation for this transceiver may cause performance degradation. In this case, it may be beneficial for the network to switch to DPS. It is noted that pausing frequency pre-compensation or switching to DPS based on delta$_{RSRP}$ exceeding the upper end of this critical range (i.e., a single-threshold based criterion) would also be expected to yield performance benefits and simpler to support.

Figure 4:
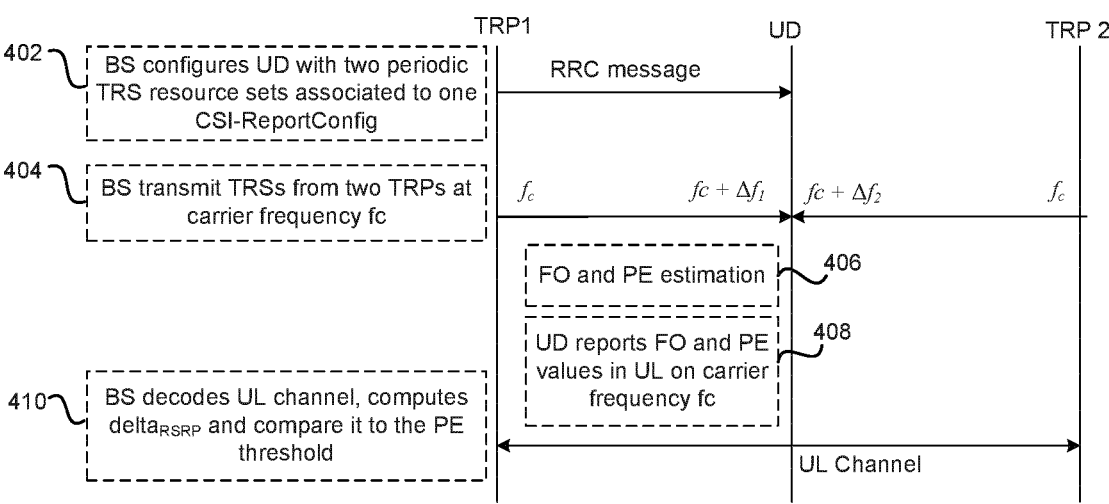
FIG. 4 illustrates a signal diagram depicting example operations of a wireless communication system with Doppler shift reporting according to an example implementation.

FIG. 4 illustrates a signal diagram 400 depicting example operations of a wireless communication system according to an example implementation. Although the signal diagram 400 is described with reference to the wireless communication system 200 of FIGS. 2A through 2B, the operations may be executed by any of the embodiments discussed herein. Although the signal diagram 400 of FIG. 4 illustrates the operations in sequential order, it will be appreciated that this is merely an example, and that additional or alternative operations may be included. Further, operations of FIG. 4 and related operations may be executed in a different order than that shown, or in a parallel or overlapping fashion.

In operation 402, the base station 202 configures the user device 204 with two periodic TRS resource sets 210 associated to one CSI report configuration data 212. In some examples, the TRS resource sets 210 are transmitted from the first transceiver (and/or the second transceiver via an RRC message during an RRC configuration procedure. The CSI report configuration data 212 causes the user device 204 to request the values of the frequency offset information 214 and/or the power estimation information 216. The two TRS resource sets 210 are transmitted on different resources (e.g., non-SFN but still belonging to the same carrier which may be referred to as distributed TRS).

In operation 404, the base station 202 transmits a TRS signal 218-1 from the first transceiver (e.g., TRP1) and a TRS signal 218-2 from the second transceiver (e.g., TRP2) (each at carrier frequency ID, which will be received at the user device 204 at frequencies $f_c+\Delta f_1$ and $f_c+\Delta f_2$. In operation 406, the user device 204 estimates the values ($\Delta f_1$, $\Delta f_2$) for the frequency offset information 214 and the values (power estimation value$_1$, power estimation value$_2$) for the power estimation information 216 using the TRS signal 218-1 and the TRS signal 218-2.

In operation 406, the user device 204 reports the frequency offset information 214 and the power estimation information 216 on the uplink channel 205 (e.g. PUCCH or PUSCH) associated with the TRS resource sets 210. In operation 410, the base station 202 decodes the uplink channel 205, computes the power estimation value difference 221 (e.g., delta$_{RSRP}$), and compares the delta$_{RSRP}$ with the power estimation threshold 222.

In some examples, if the delta$_{RSRP}$ is equal to or greater than the power estimation threshold 222, the base station 202 may continue non-pre-compensated SFN operations (except for distributed (e.g. non-SFN) TRS) since TRP2 transmissions are not yet degrading user device performance. The user device's behavior for utilizing frequency offset estimates for receiving DL channels may need to be specified. In some examples, the user device 204 uses the frequency offset estimate corresponding to the highest power estimation value for receiving subsequent DL channels. In some examples, the base station 202 indicates to the user device 204 which frequency offset estimate (e.g. from which TRS) to use for receiving DL channels by means of TCI state indication. In this case, the user device 204 is configured with two TCI states (one for each TRS) and the base station 202 activates the one corresponding to the TRS with highest power estimation value.

In some examples, if the delta$_{RSRP}$ is equal to or greater than the power estimation threshold 222 (instead of continuing non-pre-compensated SFN operations), the base station 202 may transmit a DL signal via only the strongest TRP after frequency pre-compensation because the frequency offset estimation from the TRP transmitted by the weaker TRP is not accurate enough and cannot be expected to provide good frequency pre-compensation. If the delta$_{RSRP}$ less than the power estimation threshold 222, the base station 202 may apply frequency pre-compensation to DL signals. The details of this scenario are further explained with reference to FIG. 5.

Figure 5:
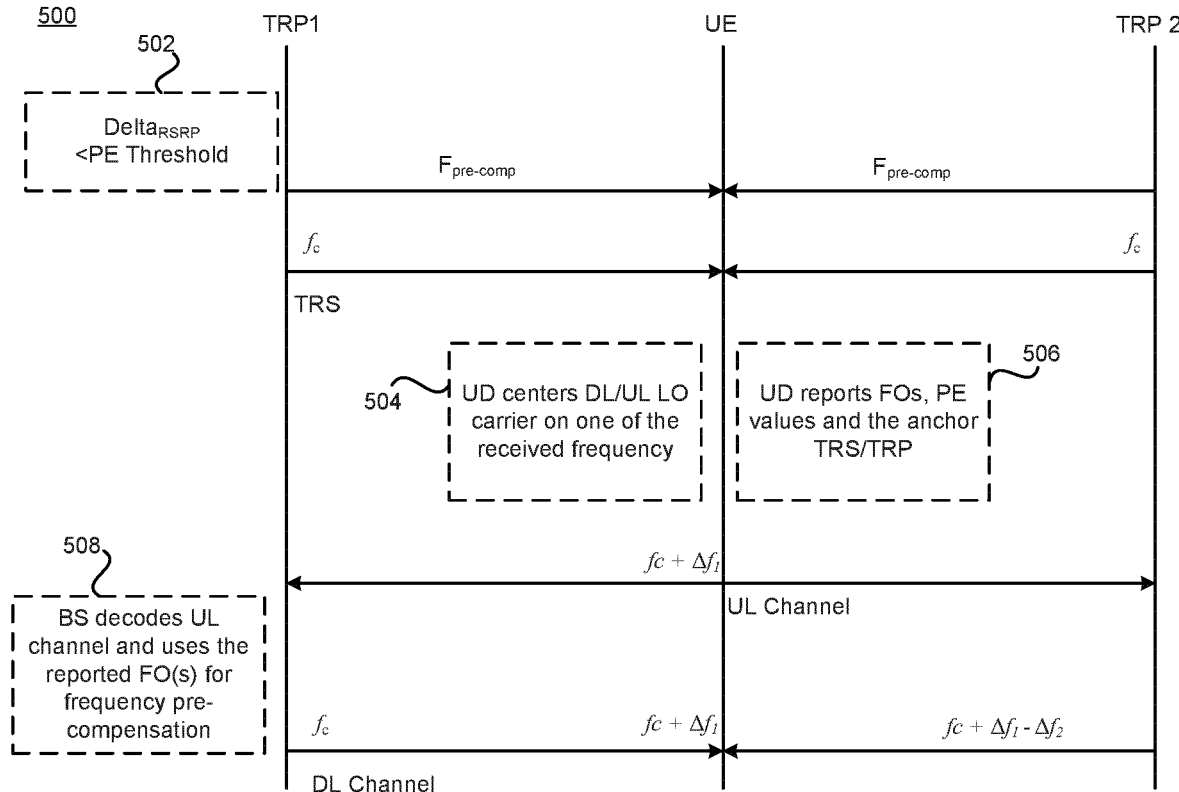
FIG. 5 illustrates a signal diagram depicting example operations of a wireless communication system with Doppler shift reporting according to another example implementation.

FIG. 5 illustrates a signal diagram 500 depicting example operations of a wireless communication system according to an aspect. Although the signal diagram 500 is described with reference to the wireless communication system 200 of FIGS. 2A through 2B, the operations may be executed by any of the embodiments discussed herein. Although the signal diagram 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion.

In operation 502, when delta$_{RSRP}$ is less than the power estimation threshold 222, the base station 202 may switch on transmission from two transceivers (e.g., TRP1 and TRP2) after frequency pre-compensation and signals it to the user device 204 via an activation signal ($F_{pre-comp}$) This information may be conveyed to the user device 204 so that the user device 204 can adapt its LO carrier from $f_c$ to $+\Delta f_1$ or $f_c+\Delta f_2$. In some examples, the activation signal ($F_{pre-comp}$) is also used to switch off transmission from the two transceivers after frequency pre-compensation when the delta$_{RSRP}$ becomes again larger than the power estimation threshold 222, e.g., when the user device 204 approaches TRP2. In some examples, the activation signal ($F_{pre-comp}$) is transmitted from the base station 202 via a downlink control information (DCI) or medium control access-control element (MAC-CE) message, where the DCI or MAC-CE message includes the activation signal.

In operation 504, the user device 204 uses the next TRS slot after receiving the activation signal ($F_{pre-comp}$) to center its DL/UL LO carrier on one of the received TRS frequencies ($f_c+\Delta f_1$ or $f_c+\Delta f_2$). The TRS, whose received frequency is used as reference for centering UE carrier, will be referred to as anchor TRS. In FIG. 5, the user device 204 centers its LO carrier around $f_c+\Delta f_1$, and therefore TRS1 is considered the anchor TRS.

In some examples, the user device 204 reports the anchor TRS along with the frequency offset information 214 and the power estimation information 216 in the CSI reporting signal 218. In some examples, the user device 204 may use the TRS received at the strongest power estimation value as the anchor TRS/TRP. For example, if the user device 204 is configured with TRS-RSRP reporting, and if the power estimation difference (e.g., the RSRP difference) is lower than the power estimation threshold 222, the user device 204 may center its DL/UL carrier frequency on the frequency of the strongest reference signal. In operation 506, the user device 204 reports estimated values and (eventually) anchor TRS in the associated CSI report at carrier frequency $f_c+\Delta f_i=\{1,2\}$ where i relates to the anchor TRS.

In operation 508, the base station 202 decodes the uplink channel 205 and uses the reported frequency offsets for frequency pre-compensation. In some examples, as shown in FIG. 5, the reported anchor TRS is the TRS1 (e.g., the first TRS resource set 210-1) and the base station 202 pre-compensates at TRS1 (e.g., the second TRS resource set 210-2) in alignment with the report. Also, the base station 202 may continue to calculate the delta$_{RSRP}$ from the reported information in order to promptly react in case the delta$_{RSRP}$ becomes again larger than the power estimation threshold 222 and de-activate frequency pre-compensation.

Figure 6:
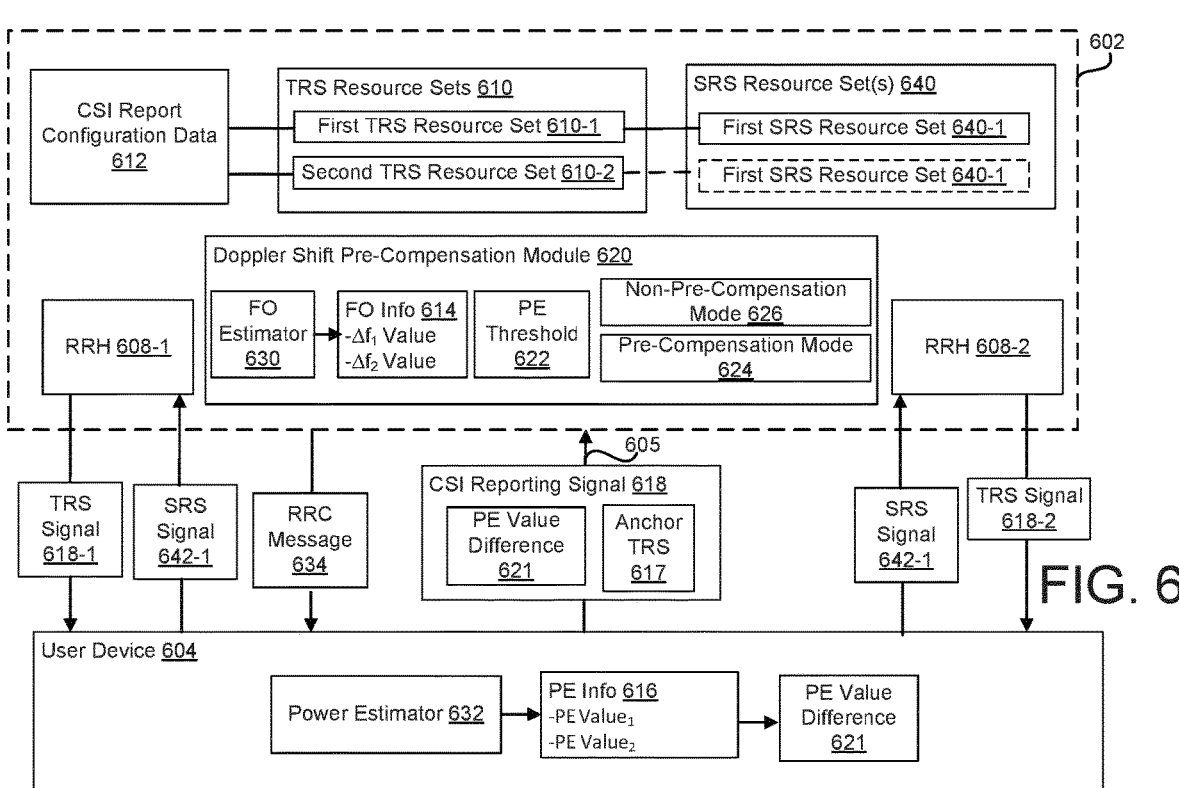
FIG. 6 illustrates a wireless communication system with Doppler shift reporting according to another example implementation.

FIG. 6 illustrates a wireless communication system 600 for enabling Doppler shift pre-compensation during an HST-SFN deployment scenario. The wireless communication system 600 may be considered an example of implicit Doppler reporting. The wireless communication system 600 may be an example of the wireless communication system 100 of FIG. 1 and/or the wireless communication system 200 of FIGS. 2A and 2B and may include any of the details discussed with reference to those figures.

The implicit Doppler shift reporting is the same/similar to the explicit reporting (as explained above) with the exception that the frequency offset information 614 is not directly signaled back to a user device 604 but rather are measured by a frequency offset estimator 630 at a base station 602 using uplink reference signals (e.g., SRS signal 642-1, SRS signal 642-2). The implicit Doppler shift reporting (as explained with reference to FIG. 6) may incorporate any of the details discussed with reference to the explicit Doppler shift reporting (as explained with reference to FIGS. 2A, 2B through 5). In some examples, additional SRS resources (e.g., SRS resource set(s) 640) are associated to TRS resource sets 610, and the base station 602 estimates the experienced Doppler shifts from the receives SRS signals (e.g., 642-1, 642-2) and uses those estimates for frequency pre-compensation. In some examples, the association of two SRS resource sets 640 to the two TRS resource sets 610 is introduced in the specification to enable the user device 604 to perform appropriate power control and to indicate DL/UL spatial relation information.

In some examples, the SRS resource set(s) 640 include a first SRS resource set 640-1 and a second SRS resource set 640-2. The first SRS resource set 640-1 may define the parameters for transmitting/receiving an SRS signal 642-1 via the first transceiver and the user device 604. The second SRS resource set 640-2 may define the parameters for transmitting/receiving an SRS signal 642-2 via the second transceiver and the user device 604. In some examples, the first SRS resource set 640-1 is associated with the first TRS resource set 610-1, and the second SRS resource set 640-2 is associated with the second TRS resource set 610-2. Also, similar to the explicit Doppler reporting example, the TRS resource sets 610 (and the SRS resource sets 640) are associated with CSI report configuration data 612 that defines which parameters are included in a CSI reporting signal 618. In some examples, the CSI reporting signal 618 defines an anchor TRS 617 and a power estimation value difference 621 (e.g., the difference between the power estimation value$_1$ and the power estimation value$_2$), which is computed by a power estimator 632 on the user device 604. For example, the anchor TRS 617 and the power estimation value difference 621 are the values reported by the user device 604 on an uplink channel 605 via the CSI reporting signal 618.

In some examples, the first transceiver (e.g., TRP1) of a first RRH 608-1 is configured to transmit a TRS signal 618-1, and the second transceiver (e.g., TRP2) of the RRH 608-2 is configured to transmit a TRS signal 618-2. The power estimator 632 uses the TRS signal 618-1 and the TRS signal 618-2 to estimate the power estimation information 616 (e.g., power estimation value$_1$ and power estimation value$_2$). Also, the power estimator 632 may compute the power estimation value difference 621 using the power estimation value$_1$ and power estimation value$_2$.

Then, the user device 604 reports the power estimation information 616 (e.g., the power estimation value difference 621) via the CSI reporting signal 618 on the uplink channel 605. In some examples, instead of computing the power estimation value difference 621, the CSI reporting signal 618 includes the individual values for the power estimation information 616. In some examples, the uplink channel 605 is a physical uplink control channel (PUCCH). In some examples, the uplink channel 605 is a physical uplink shared channel (PUSCH).

The base station 602 includes a doppler shift pre-compensation module 620. The doppler shift pre-compensation module 620 is configured to use the power estimation value difference 621 to compare it to a power estimation threshold 622 to determine whether to enter a non-pre-compensation mode 626 or a pre-compensation mode 624 and determine which transmission scheme to use in the same manner as explained with reference to the explicit Doppler reporting example. For example, the comparison of the power estimation value difference 621 to the power estimation threshold 622 may determine whether or not to pre-compensate a frequency of a downlink signal with frequency offset information 614. However, unlike the explicit Doppler shift reporting example, the frequency offset information 614 may be determined at the base station 602.

For example, the user device 604 is configured to transmit an SRS signal 642-1 to the first transceiver (e.g., RRH 608-1) and transmit an SRS signal 642-2 to the second transceiver (e.g., RRH 608-2). The doppler shift pre-compensation module 60 includes a frequency offset estimator 630 configured to estimate frequency offset information 614 using the SRS signal 642-1 and the SRS signal 642-2. For example, the frequency offset estimator 630 is configured to compute a first frequency offset value (Δli) based on the SRS signal 642-1, which is the offset experienced by the user device 604 from the first transceiver. The frequency offset estimator 630 is configured to compute a second frequency offset value (Δf$_1$) based on the SRS signal 642-2, which is the offset experienced by the user device 604 from the second transceiver.

In some examples, the SRS signals are not transmitted, and the network may switch them on/off together with the activation/deactivation of frequency pre-compensation. In some examples, the base station 602 may associate semi-persistent or aperiodic SRS resources to periodic TRS resources and switch them off/on with SRS resource (de) activation command. In some examples, the user device 604 may autonomously determine whether to transmit the configured SRS resources based on a comparison of the delta$_{RSRP}$ with the power estimation threshold 622. In some examples, SRS transmissions may be triggered when the delta$_{RSRP}$ is less than the power estimation threshold 622. In some examples, the SRS transmission are not triggered when the delta$_{RSRP}$ is greater than the power estimation threshold 622.

In some examples, one single SRS resource set 640 is configured, associated to both TRS resource sets 610. The advantage of this option compared to the embodiments discussed above is the saving of network resources, but it may come at the expense of ambiguity in the user device's power control settings due to independent channel characteristics towards TRP1 and TRP2. In order to solve this ambiguity, the user device 604 may utilize the power control settings that result in larger UL transmit power, effectively guaranteeing a target received SNR at both TRPs.

In some examples, the CSI reporting signal 618 also identifies an anchor TRS 617 (e.g., one of the first TRS resource set 610-1 and the second TRS resource set 610-2) whose frequency is used as a reference for centering the user device's carrier. In some examples, the user device 604 is configured to center its DL/UL carrier frequency on the frequency of the strongest reference signals. For example, if the power estimation value$_1$ is higher than the power estimation value$_2$, the user device 604 is configured to center its DL/UL carrier frequency using the carrier frequency plus the frequency offset associated with the first transceiver (e.g., TRP1).

FIG. 7 illustrates a flowchart 700 depicting example operations of a wireless communication system according to an aspect. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion.

Operation 702 includes transmitting, by a first transceiver of a base station, a first tracking reference signal to a user device in a wireless communication system. Operation 704 includes transmitting, by a second transceiver of the base station, a second tracking reference signal to the user device. Operation 706 includes receiving, by the base station, a channel state information (CSI) reporting signal via an uplink channel, where the CSI reporting signal includes power estimation information, and the power estimation information has been estimated by the user device using the first and second tracking reference signals. Operation 708 includes determining whether to pre-compensate a frequency of a downlink signal with frequency offset information based on the power estimation information. Operation 710 includes transmitting, by at least one of the first transceiver or the second transceiver, the downlink signal with the pre-compensated frequency in response to the determination to pre-compensate the frequency of the downlink signal.

Figure 8:
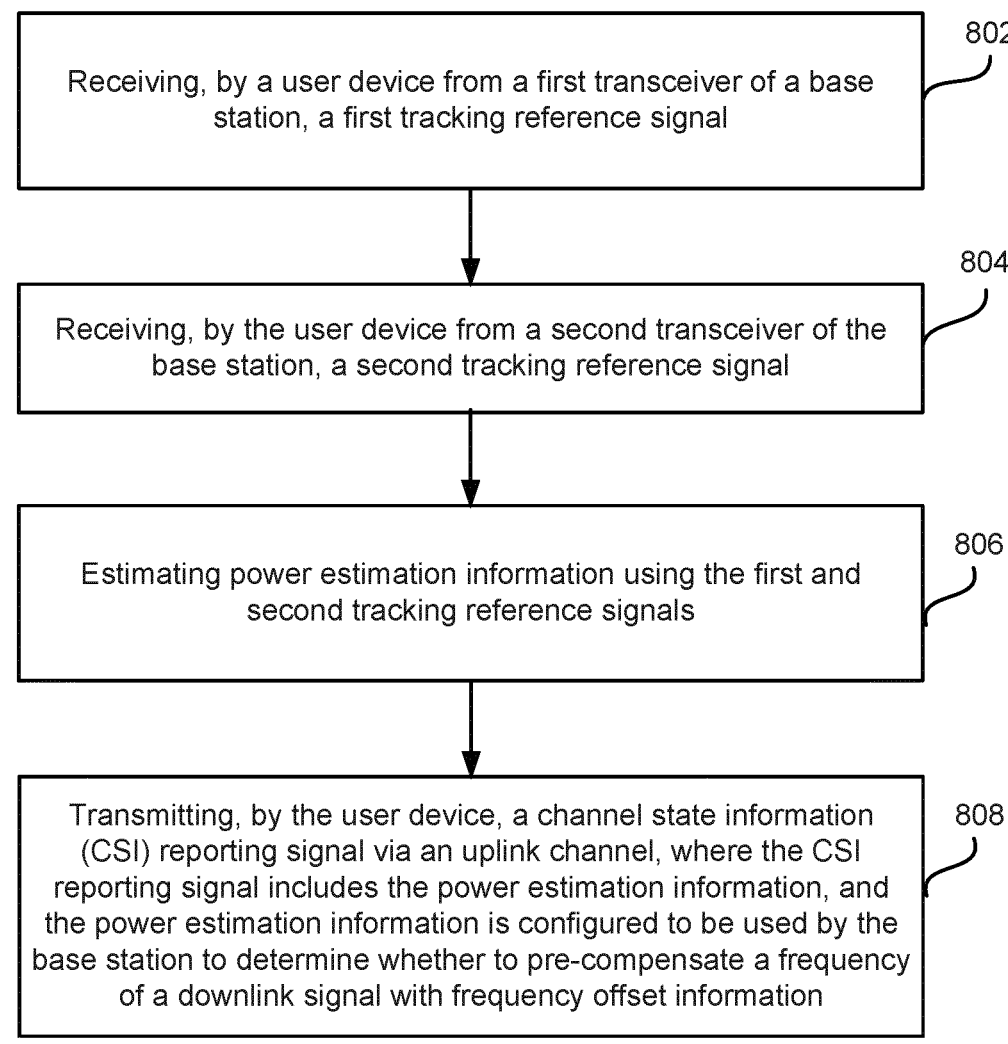
FIG. 8 illustrates a flowchart depicting example operations of a wireless communication system with Doppler shift reporting according to another example implementation.

FIG. 8 illustrates a flowchart 800 depicting example operations of a wireless communication system according to an aspect. Although the flowchart 800 of FIG. 8 illustrates the operations in sequential order, it will be appreciated that this is merely an example, and that additional or alternative operations may be included. Further, operations of FIG. 8 and related operations may be executed in a different order than that shown, or in a parallel or overlapping fashion.

Operation 802 includes receiving, by a user device from a first transceiver of a base station, a first tracking reference signal. Operation 804 includes receiving, by the user device from a second transceiver of the base station, a second tracking reference signal. Operation 806 includes estimating power estimation information using the first and second tracking reference signals. Operation 808 includes transmitting, by the user device, a channel state information (CSI) reporting signal via an uplink channel, where the CSI reporting signal includes the power estimation information, and the power estimation information is configured to be used by the base station to determine whether to pre-compensate a frequency of a downlink signal with frequency offset information.

Example 1. A method for frequency offset reporting, the method comprising: transmitting, by a first transceiver of a base station, a first tracking reference signal to a user device in a wireless communication system; transmitting, by a second transceiver of the base station, a second tracking reference signal to the user device; receiving, by the base station, a channel state information (CSI) reporting signal via an uplink channel, the CSI reporting signal including power estimation information, the power estimation information having been estimated by the user device using the first and second tracking reference signals; determining whether to pre-compensate a frequency of a downlink signal with frequency offset information based on the power estimation information; and transmitting, by at least one of the first transceiver or the second transceiver, the downlink signal with the pre-compensated frequency in response to the determination to pre-compensate the frequency of the downlink signal.

Example 2. The method of Example 1, wherein the CSI reporting signal includes the frequency offset information, the frequency offset information having been estimated by the user device using the first and second tracking reference signals.

Example 3. The method of any of Examples 1 through 2, further comprising: receiving, by the base station, first and second uplink reference signals.

Example 4. The method of any of Examples 1 through 3, further comprising: estimating, by the base station, the frequency offset information using the first and second uplink reference signals.

Example 5. The method of any of Examples 1 through 4, wherein the first and second uplink reference signals include sounding reference signals.

Example 6. The method of any of Examples 1 through 5, wherein the power estimation information includes a first power estimation value associated with the first tracking reference signal, and a second power estimation value associated with the second tracking reference signal.

Example 7. The method of any of Examples 1 through 6, the method further comprising: computing a difference between the first power estimation value and the second power estimation value.

Example 8. The method of any of Examples 1 through 7, further comprising: comparing the difference to a power estimation threshold.

Example 9. The method of any of Examples 1 through 8, further comprising: determining to pre-compensate the frequency of the downlink signal with the frequency offset information in response to the difference being less than the power estimation threshold.

Example 10. The method of any of Examples 1 through 9, further comprising: transmitting an activation signal to the user device, the activation signal indicating that frequency pre-compensation is activated.

Example 11. The method of any of Examples 1 through 10, further comprising: transmitting, by the first transceiver and the second transceiver, the downlink signal with the pre-compensated frequency.

Example 12. The method of any of Examples 1 through 11, further comprising: transmitting, by the base station, a radio resource control (RRC) message during an RRC configuration procedure, the RRC message including the power estimation threshold.

Example 13. The method of any of Examples 1 through 12, further comprising: transmitting, by the base station, a downlink control information (DCI) message, the DCI message including the activation signal.

Example 14. The method of any of Examples 1 through 13, further comprising: determining to not pre-compensate the frequency of the downlink signal with the frequency offset information in response to the difference being greater than the power estimation threshold.

Example 15. The method of any of Examples 1 through 14, further comprising: transmitting, by the first transceiver and the second transceiver, the downlink signal at a carrier frequency.

Example 16. The method of any of Examples 1 through 15, wherein the user device is configured with a first transmission configuration indicator (TCI) state and a second TCI state.

Example 17. The method of any of Examples 1 through 16, the method further comprising: selecting, by the base station, the first TCI state in response to the first power estimation value being greater than the second power estimation value.

Example 18. The method of any of Examples 1 through 17, further comprising: transmitting, by the base station, a signal indicating activation of the first TCI state such that activation of the first TCI state causes the user device to use the first tracking reference signal as source signal for the frequency offset information at the user device.

Example 19. The method of any of Examples 1 through 18, further comprising: determining to pre-compensate the frequency of the downlink signal with the frequency offset information in response to the difference being greater than the power estimation threshold.

Example 20. The method of any of Examples 1 through 19, further comprising: selecting one of the first transceiver and the second transceiver to transmit the downlink signal with the pre-compensated frequency based on the power estimation information.

Example 21. The method of any of Examples 1 through 20, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 22. The method of any of Examples 1 through 21, further comprising: transmitting, by the base station, a radio resource control (RRC) message during an RRC configuration procedure, the RRC message including a first tracking reference signal (TRS) resource set and a second TRS resource set, the first and second TRS resource sets being associated with CSI report configuration data.

Example 23. The method of any of Examples 1 through 22, wherein the RRC message includes one or more sounding reference signal (SRS) resource sets, the one or more SRS resource sets being associated with the first and second TRS resource sets.

Example 24. A method for frequency offset reporting, the method comprising: receiving, by a user device from a first transceiver of a base station, a first tracking reference signal; receiving, by the user device from a second transceiver of the base station, a second tracking reference signal; estimating power estimation information using the first and second tracking reference signals; and transmitting, by the user device, a channel state information (CSI) reporting signal via an uplink channel, the CSI reporting signal including the power estimation information, the power estimation information configured to be used by the base station to determine whether to pre-compensate a frequency of a downlink signal with frequency offset information.

Example 25. The method of Example 24, further comprising: estimating, by the user device, the frequency offset information using the first and second tracking reference signals.

Example 26. The method of any of Examples 24 through 25, wherein the CSI reporting signal includes the frequency offset information such that a first frequency offset value and a second frequency offset value are used to pre-compensate the frequency of the downlink signal.

Example 27. The method of any of Examples 24 through 26, further comprising: transmitting, by the user device, a first uplink reference signal to the first transceiver; and transmitting, by the user device, a second uplink reference to the second transceiver, wherein the first and second uplink reference signals are used to estimate the frequency offset information at the base station.

Example 28. The method of any of Examples 24 through 27, further comprising: receiving, by the user device, a first downlink signal with a pre-compensated frequency from the first transceiver; and receiving, by the user device, a second downlink signal with a pre-compensated frequency from the second transceiver.

Example 29. The method of any of Examples 24 through 28, wherein the frequency offset information includes a first frequency offset value corresponding to the first tracking reference signal and a first transmission configuration indicator (TCI) state.

Example 30. The method of any of Examples 24 through 29, wherein the frequency offset information includes a second frequency offset value corresponding to the second tracking reference signal and a second TCI state.

Example 31. The method of any of Examples 24 through 30, wherein the power estimation information includes a first power estimation value corresponding to the first tracking reference signal and a second power estimation value corresponding to the second tracking reference signal.

Example 32. The method of any of Examples 24 through 31, the method further comprising: receiving, by the user device, the downlink signal at a carrier frequency from the base station.

Example 33. The method of any of Examples 24 through 32, further comprising: activating, by the user device, the second TCI state in response to the second power estimation value being greater than the first power estimation value.

Example 34. The method of any of Examples 24 through 33, further comprising: performing demodulation of a downlink channels using the second frequency offset value.

Example 35. The method of any of Examples 24 through 34, further comprising: receiving, by the user device, a radio resource control (RRC) message during an RRC configuration procedure, the RRC message including a power estimation threshold, the power estimation threshold configured to be compared with the power estimation information.

Example 36. The method of any of Examples 24 through 35, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 37. The method of any of Examples 24 through 36, further comprising: receiving, by the user device, a radio resource control (RRC) message during an RRC configuration procedure, the RRC message including a first tracking reference signal (TRS) resource set and a second TRS resource set, the first and second TRS resource sets being associated with CSI report configuration data.

Example 38. The method of any of Examples 24 through 37, wherein the RRC message includes one or more sounding reference signal (SRS) resource sets, the one or more SRS resource sets being associated with the first and second TRS resource sets.

Example 39. An apparatus comprising: at least one processor; and at least one memory including computer program code, the at least one memory and the computer program code configured to, with the at least one processor, cause the apparatus to transmit, by a first transceiver of a base station, a first tracking reference signal to a user device in a wireless communication system; transmit, by a second transceiver of the base station, a second tracking reference signal to the user device; receive, by the base station, a channel state information (CSI) reporting signal via an uplink channel, the CSI reporting signal including power estimation information, the power estimation information having been estimated by the user device using the first and second tracking reference signals; determine whether to pre-compensate a frequency of a downlink signal with frequency offset information based on the power estimation information; and transmit, by at least one of the first transceiver or the second transceiver, the downlink signal with the pre-compensated frequency in response to the determination to pre-compensate the frequency of the downlink signal.

Example 40. The apparatus of Example 39, wherein the CSI reporting signal includes the frequency offset information, the frequency offset information having been estimated by the user device using the first and second tracking reference signals.

Example 41. The apparatus of Example 39, wherein the at least one memory and the computer program code are configured to, with the at least one processor, cause the apparatus to: receive, by the base station, first and second uplink reference signals; and estimate, by the base station, the frequency offset information using the first and second uplink reference signals.

Example 42. The apparatus of Example 41, wherein the first and second uplink reference signals include sounding reference signals.

Example 43. The apparatus of any of Examples 39 through 42, wherein the power estimation information includes a first power estimation value associated with the first tracking reference signal, and a second power estimation value associated with the second tracking reference signal, wherein the at least one memory and the computer program code are configured to, with the at least one processor, cause the apparatus to: compute a difference between the first power estimation value and the second power estimation value, compare the difference to a power estimation threshold, determine to pre-compensate the frequency of the downlink signal with the frequency offset information in response to the difference being less than the power estimation threshold, transmit an activation signal to the user device, the activation signal indicating that frequency pre-compensation is activated, and transmit, by the first transceiver and the second transceiver, the downlink signal with the pre-compensated frequency.

Example 44. The apparatus of any of Examples 39 through 43, wherein the at least one memory and the computer program code are configured to, with the at least one processor, cause the apparatus to transmit, by the base station, a radio resource control (RRC) message during an RRC configuration procedure, the RRC message including the power estimation threshold.

Example 45. The apparatus of any of Examples 39 through 44, wherein the at least one memory and the computer program code are configured to, with the at least one processor, cause the apparatus to: transmit, by the base station, a downlink control information (DCI) or medium access control-control element (MAC-CE) message, the DCI or MAC-CE message including the activation signal.

Example 46. The apparatus of any of Examples 39 through 45, wherein the at least one memory and the computer program code are configured to, with the at least one processor, cause the apparatus to: determine to not pre-compensate the frequency of the downlink signal with the frequency offset information in response to the difference being greater than the power estimation threshold; and transmit, by the first transceiver and the second transceiver, the downlink signal at a carrier frequency.

Example 47. The apparatus of any of Examples 39 through 46, wherein the user device is configured with a first transmission configuration indicator (TCI) state and a second TCI state, wherein the at least one memory and the computer program code are configured to, with the at least one processor, cause the apparatus to select, by the base station, the first TCI state in response to the first power estimation value being greater than the second power estimation value; and transmit, by the base station, a signal indicating activation of the first TCI state such that activation of the first TCI state causes the user device to use the first tracking reference signal as source signal for the frequency offset information at the user device.

Example 48. The apparatus of any of Examples 39 through 47, wherein the at least one memory and the computer program code are configured to, with the at least one processor, cause the apparatus to: determine to pre-compensate the frequency of the downlink signal with the frequency offset information in response to the difference being greater than the power estimation threshold; and select one of the first transceiver and the second transceiver to transmit the downlink signal with the pre-compensated frequency based on the power estimation information.

Example 49. The apparatus of any of Examples 39 through 48, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 50. The apparatus of any of Examples 39 through 49, wherein the at least one memory and the computer program code are configured to, with the at least one processor, cause the apparatus to: transmit, by the base station, a radio resource control (RRC) message during an RRC configuration procedure, the RRC message including a first tracking reference signal (TRS) resource set and a second TRS resource set, the first and second TRS resource sets being associated with CSI report configuration data.

Example 51. The apparatus of any of Examples 39 through 50, wherein the RRC message includes one or more sounding reference signal (SRS) resource sets, the one or more SRS resource sets being associated with the first and second TRS resource sets.

Example 52. An apparatus comprising: means for transmitting a first tracking reference signal to a user device in a wireless communication system; means for transmitting a second tracking reference signal to the user device; means for receiving a channel state information (CSI) reporting signal via an uplink channel, the CSI reporting signal including power estimation information, the power estimation information having been estimated by the user device using the first and second tracking reference signals; means for determining whether to pre-compensate a frequency of a downlink signal with frequency offset information based on the power estimation information; and means for transmitting the downlink signal with the pre-compensated frequency in response to the determination to pre-compensate the frequency of the downlink signal.

Example 53. The apparatus of Example 52, wherein the CSI reporting signal includes the frequency offset information, the frequency offset information having been estimated by the user device using the first and second tracking reference signals.

Example 54. The apparatus of Example 52, further comprising: means for receiving first and second uplink reference signals; and means for estimating the frequency offset information using the first and second uplink reference signals.

Example 55. The apparatus of Example 54, wherein the first and second uplink reference signals include sounding reference signals.

Example 56. The apparatus of any of Examples 52 through 55, wherein the power estimation information includes a first power estimation value associated with the first tracking reference signal, and a second power estimation value associated with the second tracking reference signal, the apparatus further comprising: means for computing a difference between the first power estimation value and the second power estimation value; means for comparing the difference to a power estimation threshold; means for determining to pre-compensate the frequency of the downlink signal with the frequency offset information in response to the difference being less than the power estimation threshold; means for transmitting an activation signal to the user device, the activation signal indicating that frequency pre-compensation is activated; and means for transmitting the downlink signal with the pre-compensated frequency.

Example 57. The apparatus of any of Examples 52 through 56, further comprising: means for transmitting a radio resource control (RRC) message during an RRC configuration procedure, the RRC message including the power estimation threshold.

Example 58. The apparatus of any of Examples 52 through 57, further comprising: means for transmitting a downlink control information (DCI) or medium access control-control element (MAC-CE) message, the DCI or MAC-CE message including the activation signal.

Example 59. The apparatus of any of Examples 52 through 58, further comprising: means for determining to not pre-compensate the frequency of the downlink signal with the frequency offset information in response to the difference being greater than the power estimation threshold; and means for transmitting the downlink signal at a carrier frequency.

Example 60. The apparatus of any of Examples 52 through 59, wherein the user device is configured with a first transmission configuration indicator (TCI) state and a second TCI state, the apparatus further comprising: means for selecting the first TCI state in response to the first power estimation value being greater than the second power estimation value; and means for transmitting a signal indicating activation of the first TCI state such that activation of the first TCI state causes the user device to use the first tracking reference signal as source signal for the frequency offset information at the user device.

Example 61. The apparatus of any of Examples 52 through 60, further comprising: means for determining to pre-compensate the frequency of the downlink signal with the frequency offset information in response to the difference being greater than the power estimation threshold; and means for selecting one of the first transceiver and the second transceiver to transmit the downlink signal with the pre-compensated frequency based on the power estimation information.

Example 62. The apparatus of any of Examples 52 through 61, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 63. The apparatus of any of Examples 52 through 62, further comprising: means for transmitting a radio resource control (RRC) message during an RRC configuration procedure, the RRC message including a first tracking reference signal (TRS) resource set and a second TRS resource set, the first and second TRS resource sets being associated with CSI report configuration data.

Example 64. The apparatus of any of Examples 52 through 63, wherein the RRC message includes one or more sounding reference signal (SRS) resource sets, the one or more SRS resource sets being associated with the first and second TRS resource sets.

Example 65. An apparatus comprising: at least one processor; and at least one memory including computer program code, the at least one memory and the computer program code configured to, with the at least one processor, cause the apparatus to: receive, by a user device from a first transceiver of a base station, a first tracking reference signal; receive, by the user device from a second transceiver of the base station, a second tracking reference signal; estimate power estimation information using the first and second tracking reference signals; and transmit, by the user device, a channel state information (CSI) reporting signal via an uplink channel, the CSI reporting signal including the power estimation information, the power estimation information configured to be used by the base station to determine whether to pre-compensate a frequency of a downlink signal with frequency offset information.

Example 66. The apparatus of Example 65, wherein the at least one memory and the computer program code are configured to, with the at least one processor, cause the apparatus to: estimate, by the user device, the frequency offset information using the first and second tracking reference signals, wherein the CSI reporting signal includes the frequency offset information such that a first frequency offset value and a second frequency offset value are used to pre-compensate the frequency of the downlink signal.

Example 67. The apparatus of Example 65, wherein the at least one memory and the computer program code are configured to, with the at least one processor, cause the apparatus to: transmit, by the user device, a first uplink reference signal to the first transceiver; and transmit, by the user device, a second uplink reference to the second transceiver, wherein the first and second uplink reference signals are used to estimate the frequency offset information at the base station.

Example 68. The apparatus of any of Examples 65 through 67, wherein the at least one memory and the computer program code are configured to, with the at least one processor, cause the apparatus to: receive, by the user device, a first downlink signal with a pre-compensated frequency from the first transceiver; and receive, by the user device, a second downlink signal with a pre-compensated frequency from the second transceiver.

Example 69. The apparatus of any of Examples 65 through 68, wherein the frequency offset information includes a first frequency offset value corresponding to the first tracking reference signal, the frequency offset information including a second frequency offset value corresponding to the second tracking reference signal, the power estimation information including a first power estimation value corresponding to the first tracking reference signal and a second power estimation value corresponding to the second tracking reference signal, wherein the user device is configured with a first transmission configuration indicator (TCI) state and a second TCI state, wherein the at least one memory and the computer program code are configured to, with the at least one processor, cause the apparatus to: receive, by the user device, the downlink signal at a carrier frequency from the base station; autonomously activate, by the user device, the second TCI state in response to the second power estimation value being greater than the first power estimation value; and perform demodulation of downlink channels using the second frequency offset value.

Example 70. The apparatus of any of Examples 65 through 69, wherein the at least one memory and the computer program code are configured to, with the at least one processor, cause the apparatus to: receive, by the user device, a radio resource control (RRC) message during an RRC configuration procedure, the RRC message including a power estimation threshold, the power estimation threshold configured to be compared with the power estimation information.

Example 71. The apparatus of any of Examples 65 through 70, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 72. The apparatus of any of Examples 65 through 71, wherein the at least one memory and the computer program code are configured to, with the at least one processor, cause the apparatus to: receive, by the user device, a radio resource control (RRC) message during an RRC configuration procedure, the RRC message including a first tracking reference signal (TRS) resource set and a second TRS resource set, the first and second TRS resource sets being associated with CSI report configuration data.

Example 73. The apparatus of Example 72, wherein the RRC message includes one or more sounding reference signal (SRS) resource sets, the one or more SRS resource sets being associated with the first and second TRS resource sets.

Example 74. An apparatus comprising: means for receiving a first tracking reference signal; means for receiving a second tracking reference signal; means for estimating power estimation information using the first and second tracking reference signals; and means for transmitting a channel state information (CSI) reporting signal via an uplink channel, the CSI reporting signal including the power estimation information, the power estimation information configured to be used by a base station to determine whether to pre-compensate a frequency of a downlink signal with frequency offset information.

Example 75. The apparatus of Example 74, further comprising: means for estimating the frequency offset information using the first and second tracking reference signals, wherein the CSI reporting signal includes the frequency offset information such that a first frequency offset value and a second frequency offset value are used to pre-compensate the frequency of the downlink signal.

Example 76. The apparatus of Example 74, further comprising: means for transmitting a first uplink reference signal to the first transceiver; and means for transmitting a second uplink reference to the second transceiver, wherein the first and second uplink reference signals are used to estimate the frequency offset information at the base station.

Example 77. The apparatus of any of Examples 74 through 76, further comprising: means for receiving a first downlink signal with a pre-compensated frequency from the first transceiver; and means for receiving a second downlink signal with a pre-compensated frequency from the second transceiver.

Example 78. The apparatus of any of Examples 74 through 77, wherein the frequency offset information includes a first frequency offset value corresponding to the first tracking reference signal, the frequency offset information including a second frequency offset value corresponding to the second tracking reference signal, the power estimation information including a first power estimation value corresponding to the first tracking reference signal and a second power estimation value corresponding to the second tracking reference signal, wherein the user device is configured with a first transmission configuration indicator (TCI) state and a second TCI state, the apparatus further comprising: means for receiving the downlink signal at a carrier frequency from the base station; means for autonomously activating the second TCI state in response to the second power estimation value being greater than the first power estimation value; and means for performing demodulation of downlink channels using the second frequency offset value.

Example 79. The apparatus of any of Examples 74 through 78, further comprising: means for receiving a radio resource control (RRC) message during an RRC configuration procedure, the RRC message including a power estimation threshold, the power estimation threshold configured to be compared with the power estimation information.

Example 80. The apparatus of any of Examples 74 through 79, wherein the CSI reporting signal identifies an anchor tracking reference signal, the anchor tracking reference signal being used as a reference for centering a carrier of the user device, the anchor tracking reference signal being one of the first tracking reference signal or the second tracking reference signal.

Example 81. The apparatus of any of Examples 74 through 80, further comprising: means for receiving a radio resource control (RRC) message during an RRC configuration procedure, the RRC message including a first tracking reference signal (TRS) resource set and a second TRS resource set, the first and second TRS resource sets being associated with CSI report configuration data.

Example 82. The apparatus of Example 81, wherein the RRC message includes one or more sounding reference signal (SRS) resource sets, the one or more SRS resource sets being associated with the first and second TRS resource sets.

Figure 9:
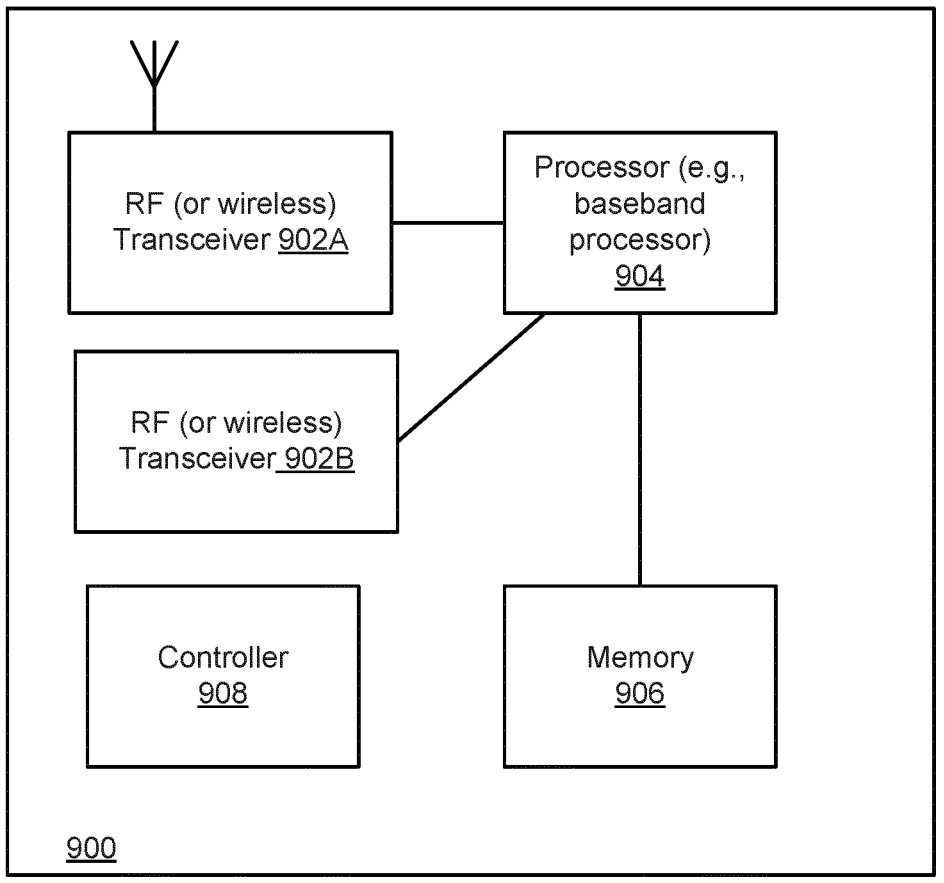
FIG. 9 is a block diagram of a wireless station according to an example implementation.

FIG. 9 is a block diagram of a wireless station (e.g., AP or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/ entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902A or 902B. Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above (e.g., any of the operations of the timing diagrams and flowcharts of the figures). Processor 904 may be (or may include), for example, hardware, programmable logic, a programmable processor that executes software or firmware, and/or any combination of these. The processor 904 may include one or more processors coupled to a substrate. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor (e.g., a processor coupled to a substrate), a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (JOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (e.g., sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors (e.g., one or more processors coupled to a substrate) executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code,
the at least one memory and the computer program code configured to, with the at least one processor, cause the apparatus to:
  receive from a first transceiver of a base station, a first tracking reference signal;
  receive from a second transceiver of the base station, a second tracking reference signal;
  estimate power estimation information using the first and second tracking reference signals; and
  transmit a channel state information (CSI) reporting signal via an uplink channel, the CSI reporting signal including the power estimation information, the power estimation information configured to be used by the base station to determine whether to pre-compensate a frequency of a downlink signal with frequency offset information,
  wherein the frequency offset information includes a first frequency offset value corresponding to the first tracking reference signal, the frequency offset information including a second frequency offset value corresponding to the second tracking reference signal, the power estimation information including a first power estimation value corresponding to the first tracking reference signal and a second power estimation value corresponding to the second tracking reference signal, wherein the apparatus is configured with a first transmission configuration indicator (TCI) state and a second TCI state, wherein the at least one memory and the computer program code are configured to, with the at least one processor, cause the apparatus to:
  receive the downlink signal at a carrier frequency from the base station;
  autonomously activate the second TCI state in response to the second power estimation value being greater than the first power estimation value; and
  perform demodulation of downlink channels using the second frequency offset value.

2. An apparatus comprising:
at least one processor; and
at least one memory including computer program code,
the at least one memory and the computer program code configured to, with the at least one processor, cause the apparatus to:
  transmit, by a first transceiver of the apparatus, a first tracking reference signal to a user device in a wireless communication system;
  transmit, by a second transceiver of the apparatus, a second tracking reference signal to the user device;
  receive a channel state information (CSI) reporting signal via an uplink channel, the CSI reporting signal including power estimation information, the power estimation information having been estimated by the user device using the first and second tracking reference signals;
  determine whether to pre-compensate a frequency of a downlink signal with frequency offset information based on the power estimation information; and
  transmit, by at least one of the first transceiver or the second transceiver, the downlink signal with the pre-compensated frequency in response to the determination to pre-compensate the frequency of the downlink signal,
  wherein the power estimation information includes a first power estimation value associated with the first tracking reference signal, and a second power estimation value associated with the second tracking reference signal, wherein the at least one memory and the computer program code are configured to, with the at least one processor, cause the apparatus to:
  compute a difference between the first power estimation value and the second power estimation value;
  compare the difference to a power estimation threshold;
  determine to pre-compensate the frequency of the downlink signal with the frequency offset information in response to the difference being less than the power estimation threshold;
  transmit an activation signal to the user device, the activation signal indicating that frequency pre-compensation is activated; and
  transmit, by the first transceiver and the second transceiver, the downlink signal with the pre-compensated frequency.

3. The apparatus of claim 2, wherein the at least one memory and the computer program code are configured to, with the at least one processor, cause the apparatus to:

transmit a radio resource control (RRC) message during an RRC configuration procedure, the RRC message including the power estimation threshold.

4. The apparatus of claim 2, wherein the at least one memory and the computer program code are configured to, with the at least one processor, cause the apparatus to:

transmit a downlink control information (DCI) or medium access control-control element (MAC-CE) message, the DCI or MAC-CE message including the activation signal.

5. The apparatus of claim 2, wherein the at least one memory and the computer program code are configured to, with the at least one processor, cause the apparatus to:

determine to not pre-compensate the frequency of the downlink signal with the frequency offset information in response to the difference being greater than the power estimation threshold; and transmit, by the first transceiver and the second transceiver, the downlink signal at a carrier frequency.

6. The apparatus of claim 5, wherein the user device is configured with a first transmission configuration indicator (TCI) state and a second TCI state, wherein the at least one memory and the computer program code are configured to, with the at least one processor, cause the apparatus to:

select the first TCI state in response to the first power estimation value being greater than the second power estimation value; and transmit a signal indicating activation of the first TCI state such that activation of the first TCI state causes the user device to use the first tracking reference signal as source signal for the frequency offset information at the user device.

7. The apparatus of claim 2, wherein the at least one memory and the computer program code are configured to, with the at least one processor, cause the apparatus to:

determine to pre-compensate the frequency of the downlink signal with the frequency offset information in response to the difference being greater than the power estimation threshold; and select one of the first transceiver and the second transceiver to transmit the downlink signal with the pre-compensated frequency based on the power estimation information.

\* \* \* \* \*